US010198810B2

(12) United States Patent
Chow et al.

(10) Patent No.: US 10,198,810 B2
(45) Date of Patent: Feb. 5, 2019

(54) FREE-BREATHING PARAMETER MAPPING WITH HIGH-CONTRAST IMAGE REGISTRATION

(71) Applicant: University of Virginia Patent Foundation, Charlottesville, VA (US)

(72) Inventors: Kelvin Chow, Chicago, IL (US); Yang Yang, Charlottesville, VA (US); Michael Salerno, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 15/267,371

(22) Filed: Sep. 16, 2016

(65) Prior Publication Data
US 2017/0076449 A1    Mar. 16, 2017

Related U.S. Application Data

(60) Provisional application No. 62/219,474, filed on Sep. 16, 2015.

(51) Int. Cl.
*G06T 7/00* (2017.01)

(52) U.S. Cl.
CPC .......... *G06T 7/0012* (2013.01); *G06T 7/0024* (2013.01); *G06T 7/0081* (2013.01); *G06T 2207/10088* (2013.01)

(58) Field of Classification Search
CPC .......... G06K 9/00013; G06K 9/00026; G06K 9/00127; G06T 7/0012; G06T 2207/30004
See application file for complete search history.

(56) References Cited

U.S. PATENT DOCUMENTS 7,174,200 B2   2/2007   Salerno et al.
8,700,127 B2   4/2014   Salerno et al.
(Continued)

FOREIGN PATENT DOCUMENTS

WO   2002084305   10/2002

OTHER PUBLICATIONS

Roujol et al.: Improved motion correction for T1 mapping. Journal of Cardiovascular Magnetic Resonance 2014 16(Suppl 1):P45 Year: 2014).*

(Continued)

*Primary Examiner* — Bobbak Safaipour
(74) *Attorney, Agent, or Firm* — Meunier Carlin & Curfman LLC

(57) ABSTRACT

In one aspect, the disclosed technology relates to a method which, in one example embodiment, includes acquiring magnetic resonance imaging data for a plurality of images of the heart of a subject during free breathing of the subject. The method also includes generating an additional plurality of images with high tissue-blood contrast over the region of interest, and selecting a subset of images from the plurality of images, based upon a pre-determined quality metric of image similarity, to be used for non-rigid image registration. The method also includes aligning the subset of images by non-rigid image registration using a combination of the plurality of images and the additional plurality of images, and creating a parametric map from the aligned images.

19 Claims, 11 Drawing Sheets
(9 of 11 Drawing Sheet(s) Filed in Color)

(56) References Cited

U.S. PATENT DOCUMENTS

| | | | | |
|---|---|---|---|---|
| 8,781,197 | B2* | 7/2014 | Wang | G01R 33/54<br>382/131 |
| 9,274,198 | B2* | 3/2016 | Menini | G06T 11/006 |
| 2004/0059213 | A1* | 3/2004 | Kassai | A61B 5/055<br>600/410 |
| 2006/0074292 | A1* | 4/2006 | Thomson | A61B 6/032<br>600/411 |
| 2008/0021304 | A1* | 1/2008 | Stemmer | G01R 33/4824<br>600/410 |
| 2011/0148928 | A1* | 6/2011 | Gopalakrishnan | A61B 6/037<br>345/643 |
| 2011/0176710 | A1* | 7/2011 | Mattiuzzi | G06F 19/321<br>382/128 |
| 2011/0311115 | A1* | 12/2011 | Li | G06T 7/37<br>382/128 |
| 2012/0078085 | A1* | 3/2012 | Xue | A61B 5/055<br>600/420 |
| 2012/0121153 | A1* | 5/2012 | Xue | G06T 5/50<br>382/131 |
| 2013/0307536 | A1 | 11/2013 | Feng et al. | |
| 2014/0219531 | A1 | 8/2014 | Epstein et al. | |
| 2015/0123659 | A1* | 5/2015 | Weingartner | A61B 5/055<br>324/309 |
| 2015/0287222 | A1 | 10/2015 | Zhao et al. | |
| 2015/0294497 | A1* | 10/2015 | Ng | A61B 34/20<br>382/128 |
| 2016/0140712 | A1* | 5/2016 | Ohyu | A61B 6/481<br>382/131 |
| 2016/0350946 | A1* | 12/2016 | Schieke | G06T 11/008 |
| 2017/0112449 | A1* | 4/2017 | Huang | A61B 5/7207 |
| 2017/0278244 | A1* | 9/2017 | Luo | G06T 7/0036 |
| 2018/0025512 | A1* | 1/2018 | Zhu | G06T 7/0081 |

OTHER PUBLICATIONS

Chow, Kelvin, et al. "Robust free-breathing SASHA T1 mapping with high-contrast image registration." Journal of Cardiovascular Magnetic Resonance 18.1 (2016): 47. (Year: 2016).*

Kali A. et al., "Native T1 mapping by 3-T CMR imaging for characterization of chronic myocardial infarctions", JACC: Cardiovascular Imaging, 2015, pp. 8:1019-30, Elsevier.

Dass S. et al., "Myocardial tissue characterization using magnetic resonance noncontrast T1 mapping in hypertrophic and dilated cardiomyopathy", Circ. Cardiovasc Imaging, 2012, pp. 5:726-33, American Heart Association.

Karamitsos T.D. et al., "Noncontrast T1 mapping for the diagnosis of cardiac amyloidosis", JACC Cardiovasc Imaging, 2013, pp. 6:488-97, Elsevier.

Brooks J. et al., "Markedly increased volume of distribution of gadolinium in cardiac amyloidosis demonstrated by T1 mapping", J Magn Reson Imaging, 2013, pp. 38:1591-5, Wiley Periodicals.

Sado D.M. et al., "Noncontrast myocardial T1 mapping using cardiovascular magnetic resonance for iron overload", J Magn Reson Imaging, 2014, pp. 41:1505-11, Wiley Periodicals.

Sado D.M. et al., "Identification and assessment of Anderson-Fabry disease by cardiovascular magnetic resonance noncontrast myocardial T1 mapping", Circ Cardiovasc Imaging, 2013, pp. 6:392-8, American Heart Association.

Thompson R.B. et al., "T1 mapping with cardiovascular MRI is highly sensitive for Fabry disease independent of hypertrophy and sex", Circ Cardiovasc Imaging, 2013, pp. 6:637-45, American Heart Association.

Pica S. et al., "Reproducibility of native myocardial T1 mapping in the assessment of Fabry disease and its role in early detection of cardiac involvement by cardiovascular magnetic resonance", J Cardiovasc Magn Reson, 2014, pp. 16:99.

Sado D.M. et al., "Cardiovascular magnetic resonance measurement of myocardial extracellular volume in health and disease", Heart, 2012, pp. 98:1436-41.

Kellman P. et al., "Extracellular volume fraction mapping in the myocardium, part 1: evaluation of an automated method", J Cardiovasc Magn Reson, 2012, pp. 14:63.

Kellman P. et al., "Extracellular volume fraction mapping in the myocardium, part 2: initial clinical experience", J Cardiovasc Magn Reson, 2012, pp. 14:64.

Jellis C. et al., "Association of imaging markers of myocardial fibrosis with metabolic and functional disturbances in early diabetic cardiomyopathy", Circ Cardiovasc Imaging, 2011, pp. 4:693-702.

Bull S. et al., "Human non-contrast T1 values and correlation with histology in diffuse fibrosis", Heart, 2013, pp. 99:932-7.

Kuruvilla S. et al, "Increased Extracellular volume and Altered Mechanics Are Associated With LVH in Hypertensive Heart Disease. Not Hypertension Alone", JACC Cardiovasc Imaging, 2015, pp. 8:172-80.

Messroghli D.R. et al., "Modified Look-Locker inversion recovery (MOLLI) for high-resolution T1 mapping of the heart", Magn Reson Med, 2004, pp. 52:141-6.

Messroghli D.R. et al., "Optimization and validation of a fully-integrated pulse sequence for modified look-locker inversion-recovery (MOLLI) T1 mapping of the heart", J Magn Reson Imaging, 2007, pp. 26:1081-6.

Chow K et al., "T2-dependent errors in MOLLI T1 values: simulations, phantoms, and in-vivo studies", J Cardiovasc Magn Reson, 2012, pp. 14(Suppl 1):P281.

Robson M.D. et al., "T1 measurements in the human myocardium: The effects of magnetization transfer on the SASHA and MOLLI sequences", Magn Reson Med, 2013, pp. 70:670, Wiley Periodicals.

Kellman P. et al., "Influence of Off-resonance in myocardial T1-mapping using SSFP based MOLLI method", J Cardiovasc Magn Reson, 2013, pp. 15:63.

Kellman P. et al., "T1-mapping in the heart: accuracy and precision", J Cardiovasc Magn Reson, 2014, pp. 16:2.

Chow K. et al., "Saturation recovery single-shot acquisition (SASHA) for myocardial T1 mapping", Magn Reson Med, 2014, pp. 71:2082-95.

Slavin G.S. et al., "Breath-Held Myocardial T1 Mapping Using Multiple Single-Point Saturation Recovery", Proc Intl Soc Mag Reson Med, 2012, pp. 20:1244.

Weingartner S. et al., "Combined saturation/inversion recovery sequences for improved evaluation of scar and diffuse fibrosis in patients with arrhythmia or heart rate variability", Magn Reson Med, 2014, pp. 71:1024-34.

Taylor A.J. et al., "T1 Mapping: Basic Techniques and Clinical Applications", JACC Cardiovasc Imaging, 2016, pp. 9:67-81.

Mehta B.B. et al., "Accelerated and navigator-gated look-locker imaging for cardiac T1 estimation (ANGIE): Development and application to T1 mapping of the right ventricle", Magn Reson Med, 2014.

Kellman P. et al., "Motion-corrected free-breathing delayed enhancement imaging of myocardial infarction", Magn Reson Med, 2005, pp. 53:194-200.

Kellman P. et al., "Free-breathing T2* mapping using respiratory motion corrected averaging", J Cardiovasc Magn Reson, 2015, pp. 17:3.

Akcakaya M. et al., "On the selection of sampling points for myocardial T1 mapping", Magn Reson Med, 2015, pp. 73:1741-53.

Kellman P. et al., "Optimized saturation recovery protocols for T1-mapping in the heart: influence of sampling strategies on precision", J Cardiovasc Magn Reson, 2014, pp. 16:55.

Griswold M.A. et al., "Generalized autocalibrating partially parallel acquisitions (GRAPPA)", Magn Reson Med, 2002, pp. 47:1202-10.

Haacke E.M. et al., "A fast, iterative, partial-fourier technique capable of local phase recovery", J Magn Reson, 1991, pp. 92:126-45.

Captur G. et al., "A T1 and ECV phantom for global T1 mapping quality assurance: The T1 mapping and ECV standardisation in CMR (T1MES) program", J Cardiovasc Magn Reson, 2016, pp. 18:W18-W571.

Chow K. et al., "Saturation pulse design for quantitative myocardial T1 mapping", J Cardiovasc Magn Reson, 2015, pp. 17:84.

Deichmann R. et al., "Quantification of T1 values by Snapshot—Flash NMR imaging", J Magn Reson, 1992, pp. 96:608-12.

(56) References Cited

OTHER PUBLICATIONS

Hargreaves B.A. et al., "Variable-rate selective excitation for rapid MRI sequences", Magn Reson Med, 2004, pp. 52:590-7.
Katscher U. et al., "Parallel RF transmission in MRI", NMR Biomed, 2006, pp. 19:393-400.
Ledesma-Carbayo M.J. et al., "Motion corrected free-breathing delayed-enhancement imaging of myocardial infarction using nongrid registration", J Magn Reson Imaging, 2007, pp. 26:184-90.

* cited by examiner

FREE-BREATHING PARAMETER MAPPING WITH HIGH-CONTRAST IMAGE REGISTRATION

CROSS-REFERENCE TO RELATED APPLICATIONS

This Application claims priority to, and benefit under 35 U.S.C. § 119 (e) of, U.S. Provisional Patent Application No. 62/219,474, filed Sep. 16, 2015, which is hereby incorporated by reference herein in its entirety as if fully set forth below.

STATEMENT OF RIGHTS UNDER FEDERALLY-SPONSORED RESEARCH

This invention was made with government support under grants NIH K23 HL112910-01 and NIH T32 EB003841, awarded by the National Institutes of Health. The government has certain rights in this invention.

BACKGROUND

Reliable assessment of increased myocardial extracellular volume, often due to diffuse interstitial fibrosis, is of significant clinical interest due to its ubiquitous presence in many cardiac diseases. Recent studies have shown altered native myocardial $T_1$ values in patients with a wide range of diseases including patients with ST-segment elevation myocardial infarction (STEMI) and non-STEMI [1] and hypertrophic and dilated cardiomyopathy [2], as well as infiltrative diseases such as amyloidosis [3, 4], iron overload [5], and Anderson-Fabry disease [6-8]. $T_1$ mapping with gadolinium contrast can also be used to estimate the extracellular volume fraction (ECV), a physiologically relevant parameter that increases with diffuse interstitial fibrosis and infiltrative diseases, and abnormal ECV values have been reported across a wide spectrum of cardiac diseases [9-11].

Correlations of abnormal $T_1$ values with other biomarkers of myocardial remodeling have also been reported in asymptomatic patients with diabetes [12], aortic stenosis [13], and hypertension with left ventricular hypertrophy [14], suggesting $T_1$ may also be a sensitive marker of early pre-clinical remodeling.

Reliable ECV quantification requires techniques with both high accuracy and precision. Accurate $T_1$ mapping techniques without systematic confounders are intuitively desirable because they may be more specific to $T_1$ changes associated with changes in ECV. While the MOdified Look-Locker Inversion recovery (MOLLI) technique [15, 16] has gained widespread adoption, it is sensitive to factors such as $T_2$[17], magnetization transfer [18], and off-resonance [19], and changes in any of these confounders result in changes in measured $T_1$ values [20]. Saturation-recovery based sequence such SAturation-recovery single-SHot Acquisition (SASHA) [21], Saturation Method using Adaptive Recovery Times (SMART$_1$Map) [22], and SAturation Pulse Prepared Heart rate independent Inversion-REcovery sequence (SAPPHIRE) [23] are more robust to these confounders, but their adoption has been limited by poorer precision, which results from reduced dynamic range and signal-to-noise compared to the inversion-recovery based MOLLI sequence [20, 24]. Higher precision techniques with less variability are needed to reliably detect subtle $T_1$ changes in individual patients and to better identify focal $T_1$ abnormalities.

Free-breathing $T_1$ mapping techniques can potentially increase precision compared to breath-hold techniques by acquiring more images over a longer duration, thus reducing uncertainty in calculated $T_1$ values. Free-breathing approaches also extend the utility of $T_1$ mapping to patients who are unable to adequately hold their breath, such as those with shortness of breath or heart failure. One common approach for addressing respiratory motion during free-breathing $T_1$ acquisitions is to use respiratory navigator triggering, such as in the high-resolution Accelerated and Navigator-Gated Look-Locker Imaging for cardiac $T_1$ Estimation (ANGIE) $T_1$ mapping sequence [25]. The position of the diaphragm is monitored using a separate acquisition and imaging is performed within a small window of respiratory phase. However, cardiac imaging with respiratory navigation may still have considerable residual motion because the heart and lung do not always move in perfect unison. Additionally, respiratory navigators can be challenging in routine clinical practice, as clinical patients often have irregular respiratory patterns that reduce navigator gating efficiency.

An alternative approach to free-breathing imaging is to continuously acquire images in all respiratory phases and use image registration to align a subset of images. This approach has been successfully applied to late gadolinium enhancement [26] and $T^*_2$ imaging [27], but direct image registration of SASHA's saturation recovery images is challenging due to poor tissue-blood contrast. While $T_1$ mapping with saturation recovery is one particular example of a parametric mapping technique with poor, or varying blood-tissue contrast, parametric mapping of other parameters such as diffusion, magnetization transfer, $T_2$, etc. may also benefit from approaches aimed at improving non-rigid registration in the setting of low-contrast images.

It is with respect to these and other considerations that the various aspects of the disclosed technology as described below are presented.

SUMMARY

In one aspect, the disclosed technology relates to a method which, in one example embodiment, includes acquiring magnetic resonance imaging data for a plurality of images of the heart of a subject during free breathing of the subject. The method also includes generating an additional, second plurality of images with high tissue-blood contrast over a region of interest, and selecting a subset of images from the first plurality of images, based upon a pre-determined quality metric of image similarity, to be used for non-rigid image registration. The method further includes aligning the subset of images by non-rigid image registration, using a combination of the first plurality of images and the second plurality of images, and creating a parametric map from the aligned images.

The method may also include obtaining additional imaging data to generate the second plurality of images. The second plurality of images may be generated from a subset of the acquired magnetic resonance imaging data from the first plurality of images. The method may also include producing, from the first plurality of images and using the additional imaging data, high-contrast images of the region of interest.

The additional image data may be obtained by acquiring k-space data covering a central portion of k-space. Generating the second plurality of images may include sharing the additional imaging data with k-space data acquired from the first plurality of images.

The imaging data may be obtained using saturation recovery, inversion recovery, a diffusion preparation, or a T2 preparation. Acquiring the imaging data may use a gradient echo-based readout module, steady-state free precession-based, spin-echo based readout module, or gradient and spin echo based readout module. Acquiring the imaging data may include acquiring k-space along a cartesian, spiral, radial, or other k-space trajectory.

Acquiring the imaging data may include applying a saturation recovery, inversion recovery, T2-preparation, diffusion preparation, magnetization transfer preparation, or other contrast preparation. The imaging data may be acquired by applying a saturation recovery-based sequence, which may include a single-shot steady-state free precession (SSFP) acquisition.

Correlation or a similar metric may be used to estimate the image similarity, and the subset of images may be selected based on the quality metric. The method may further include estimating displacement of the heart from respiratory motion of the subject, using rigid or non-rigid image registration, where the subset of images is selected based on a similarity metric of the displacement of the heart.

Aligning the subset of images using non-rigid image registration may include determining a deformation field from the non-rigid image registration and applying the deformation field to at least some images of the subset of images to align the subset of images. The non-rigid image registration may include applying a non-rigid image registration algorithm using primary images and difference images of the subset of images.

The parametric map may be derived from a contrast preparation using saturation recovery, inversion recovery, $T_2$-preparation, diffusion preparation, or magnetization transfer preparation. The parametric map may be a $T_1$ map. The parametric map may be determined by fitting a model-based equation.

In another aspect, the disclosed technology relates to a system which, in one example embodiment, includes a data acquisition device configured to acquire magnetic resonance imaging data for a first plurality of images of the heart of a subject during free breathing of the subject. The system also includes one or more processors configured to cause the system to perform functions that include generating an additional, second plurality of images with high-tissue-blood contrast over a region of interest, and selecting a subset of images from the first plurality of images, based upon a pre-determined quality metric of image similarity, to be used for non-rigid image registration. The functions performed by the system also include aligning the subset of images using non-rigid image registration, using a combination of the first plurality of images and the second plurality of images, and creating a parametric map from the aligned images.

In yet another aspect, the disclosed technology relates to a non-transitory computer-readable medium having stored instructions that, when executed by one or more processors, cause a computing device to perform specific functions. The functions performed include acquiring magnetic resonance imaging data for a first plurality of images of the heart of a subject during free breathing of the subject. The functions performed also include generating an additional, second plurality of images with high-tissue-blood contrast over a region of interest, and selecting a subset of images from the first plurality of images, based upon a pre-determined quality metric of image similarity, to be used for non-rigid image registration. The functions performed also include aligning the subset of images using non-rigid image registration, using a combination of the first plurality of images and the second plurality of images, and creating a parametric map from the aligned images.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale. The patent or application file contains at least one drawing executed in color. Copies of this patent or patent application publication with the color drawing(s) will be provided by the Office upon request and payment of the necessary fee.

FIG. 3A shows readout flip angles increased in a sinusoidal ramp pattern for 120° SASHA-VFA (green circles) and 70° SASHA-VFA (dashed blue line). FIG. 3B shows signal evolution of myocardium (blue) and blood (red) for a non-saturated image using 120° SASHA-VFA. Typical k-space center locations for the primary and high-contrast images are marked with light blue and dashed red boxes, respectively. FIG. 3C shows signal evolution for a saturation recovery image using 120° SASHA-VFA.

DETAILED DESCRIPTION

Figure 1:
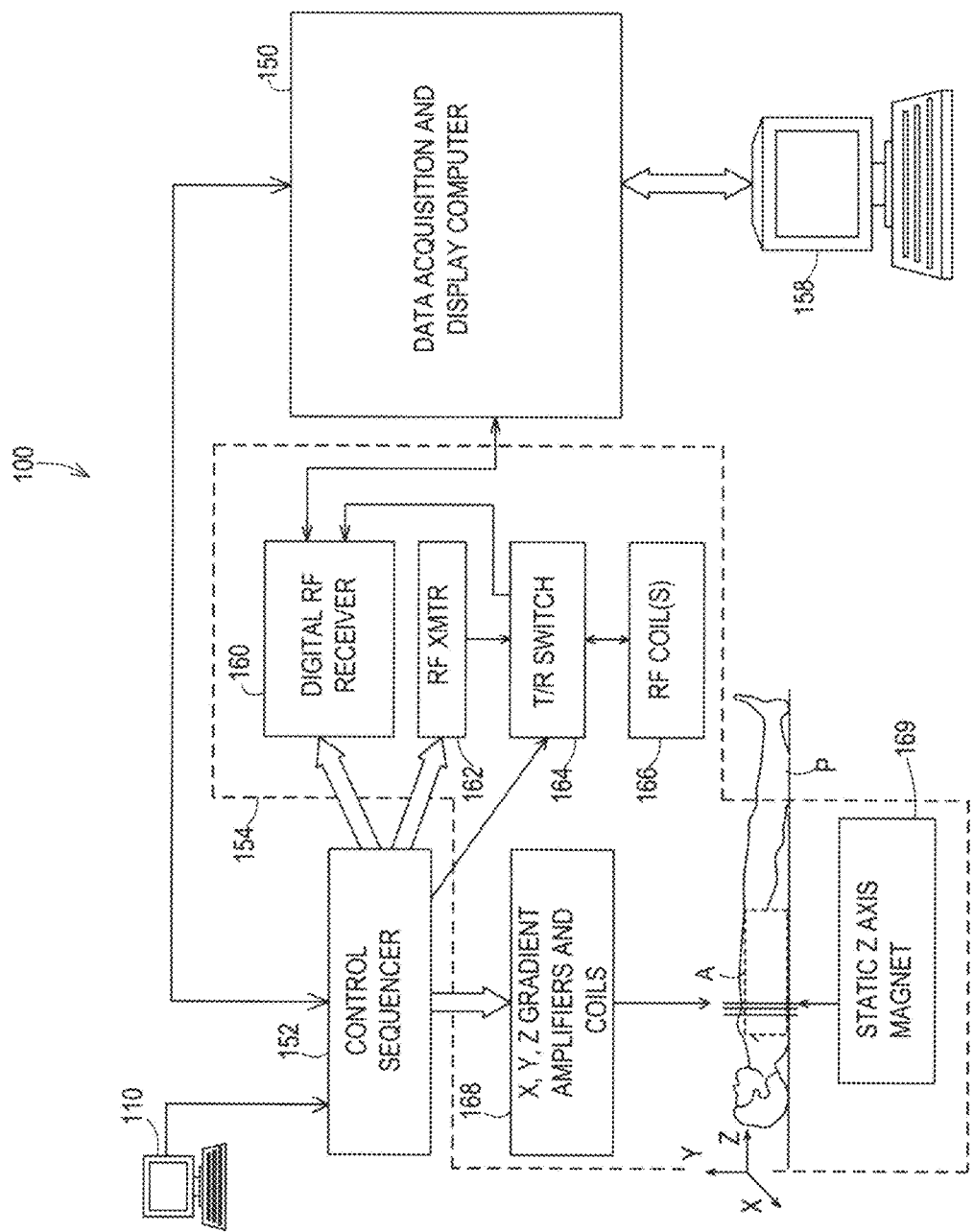
FIG. 1 is a system diagram illustrating an imaging system capable of implementing aspects of the disclosed technology in accordance with one or more example embodiments.

In some aspects, the disclosed technology relates to free-breathing parameter mapping with high-contrast image registration. Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

As discussed herein, a "subject" (or "patient") may be any applicable human, animal, or other organism, living or dead, or other biological or molecular structure or chemical environment, and may relate to particular components of the subject, for instance specific organs, tissues, or fluids of a subject, may be in a particular location of the subject, referred to herein as an "area of interest" or a "region of interest."

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the $n^{th}$ reference in the list. For example, [4] refers to the $5^{th}$ reference in the list, namely Sado D M, Maestrini V, Piechnik S K, Banypersad S M, White S K, Flett A S, et al. Noncontrast myocardial $T_1$ mapping using cardiovascular magnetic resonance for iron overload. J Magn Reson Imaging. 2014; 41:1505-11. All references cited and discussed in this specification are incorporated herein by reference in their entireties and to the same extent as if each reference was individually incorporated by reference.

A detailed description of aspects of the disclosed technology, in accordance with various example embodiments, will now be provided with reference to the accompanying drawings. The drawings form a part hereof and show, by way of illustration, specific embodiments and examples. In referring to the drawings, like numerals represent like elements throughout the several figures.

FIG. 1 is a system diagram illustrating an operating environment capable of implementing aspects of the disclosed technology in accordance with one or more example embodiments. FIG. 1 illustrates an example of a magnetic resonance imaging (MRI) system 100, including a data acquisition and display computer 150 coupled to an operator console 110, an MRI real-time control sequencer 152, and an MRI subsystem 154. The MRI subsystem 154 may include XYZ magnetic gradient coils and associated amplifiers 168, a static Z-axis magnet 169, a digital RF transmitter 162, a digital RF receiver 160, a transmit/receive switch 164, and RF coil(s) 166. The MRI subsystem 154 may be controlled in real time by control sequencer 152 to generate magnetic and radio frequency fields that stimulate magnetic resonance phenomena in a subject P to be imaged, for example, to implement magnetic resonance imaging sequences in accordance with various example embodiments of the disclosed technology described herein. An image of an area of interest A of the subject P (which may also be referred to herein as a "region of interest") may be shown on display 158. The display 158 may be implemented through a variety of output interfaces, including a monitor, printer, or data storage.

The area of interest A corresponds to a region associated with one or more physiological activities in subject P. The area of interest shown in the example embodiment of FIG. 1 corresponds to a chest region of subject P, but it should be appreciated that the area of interest for purposes of implementing various aspects of the disclosure presented herein is not limited to the chest area. It should be recognized and appreciated that the area of interest in various embodiments may encompass various areas of subject P associated with various physiological characteristics, such as, but not limited to the heart region. Physiological activities that may be evaluated by methods and systems in accordance with various embodiments of the disclosed technology may include, but are not limited to cardiac activity and conditions.

It should be appreciated that any number and type of computer-based medical imaging systems or components, including various types of commercially available medical imaging systems and components, may be used to practice certain aspects of the disclosed technology. Systems as described herein with respect to example embodiments are not intended to be specifically limited to magnetic resonance imaging (MRI) implementations or the particular system shown in FIG. 1.

One or more data acquisition or data collection steps as described herein in accordance with one or more embodiments may include acquiring, collecting, receiving, or otherwise obtaining data such as imaging data corresponding to an area of interest. By way of example, data acquisition or collection may include acquiring data via a data acquisition device, receiving data from an on-site or off-site data acquisition device or from another data collection, storage, or processing device. Similarly, data acquisition or data collection devices of a system in accordance with one or more embodiments of the disclosed technology may include any device configured to acquire, collect, or otherwise obtain data, or to receive data from a data acquisition device within the system, an independent data acquisition device located on-site or off-site, or another data collection, storage, or processing device.

Figure 2:
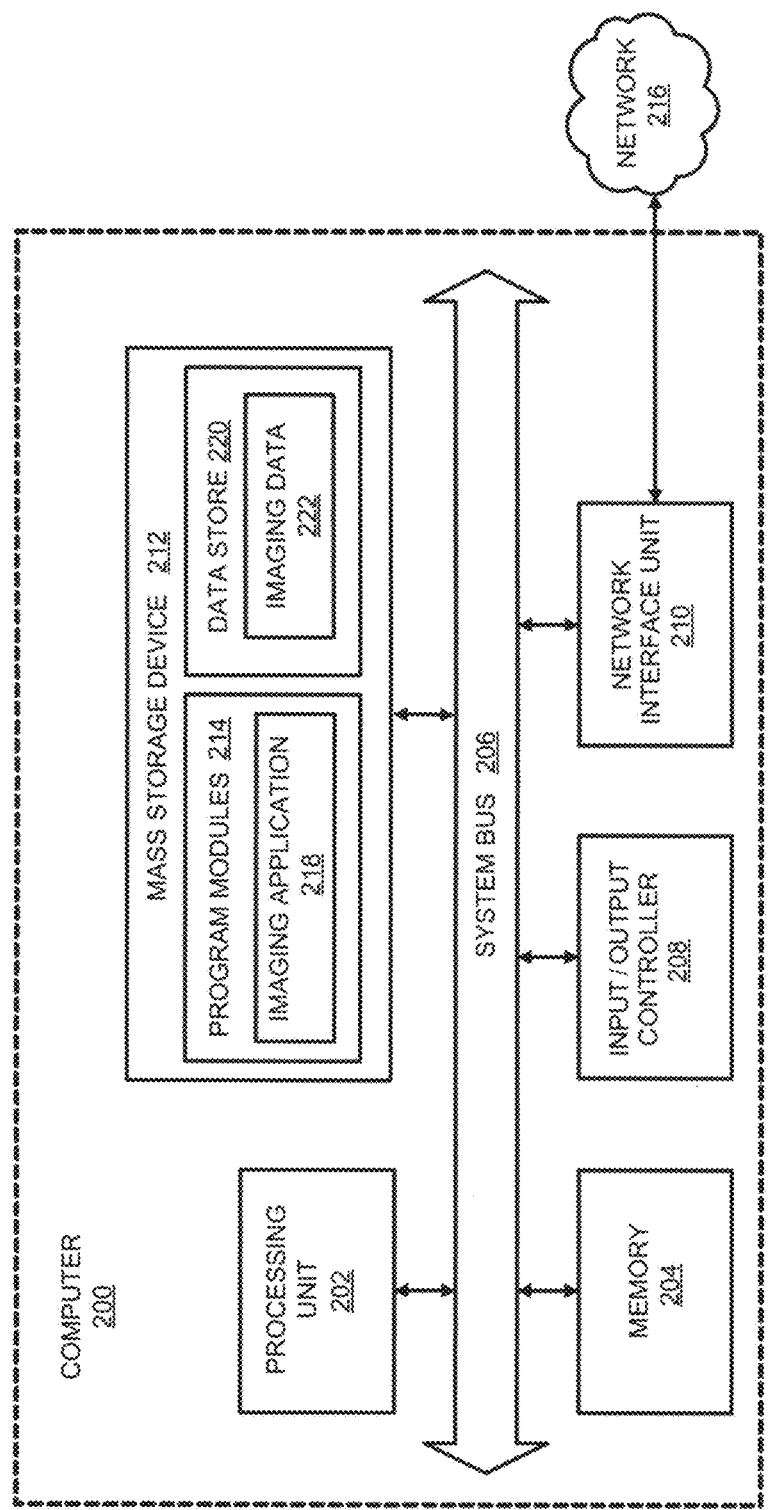
FIG. 2 is a computer architecture diagram showing a general computing system capable of implementing aspects of the disclosed technology in accordance with one or more example embodiments.

FIG. 2 is a computer architecture diagram showing a general computing system capable of implementing aspects of the disclosed technology in accordance with one or more embodiments described herein. A computer 200 may be configured to perform one or more functions associated with embodiments illustrated in one or more of FIGS. 3-11. For example, the computer 200 may be configured to perform various aspects of free-breathing parameter mapping with high-contrast image registration in accordance with example embodiments, such as magnetic resonance imaging data acquisition, image registration, and calculating parameter maps. It should be appreciated that the computer 200 may be implemented within a single computing device or a computing system formed with multiple connected computing devices. The computer 200 may be configured to perform various distributed computing tasks, in which processing and/or storage resources may be distributed among the multiple devices. The data acquisition and display computer 150 and/or operator console 110 of the system shown in FIG. 1 may include one or more systems and components of the computer 200.

As shown, the computer 200 includes a processing unit 202 ("CPU"), a system memory 204, and a system bus 206 that couples the memory 204 to the CPU 202. The computer 200 further includes a mass storage device 212 for storing program modules 214. The program modules 214 may be operable to perform associated with embodiments illustrated in one or more of FIGS. 3-11 discussed below. The program modules 214 may include an imaging application 218 for performing data acquisition and/or processing functions as described herein, for example to acquire and/or process image data corresponding to magnetic resonance imaging of an area of interest. The computer 200 can include a data store 220 for storing data that may include imaging-related data 222 such as acquired data from the implementation of magnetic resonance imaging in accordance with various embodiments of the disclosed technology.

The mass storage device 212 is connected to the CPU 202 through a mass storage controller (not shown) connected to the bus 206. The mass storage device 212 and its associated computer-storage media provide non-volatile storage for the computer 200. Although the description of computer-storage media contained herein refers to a mass storage device, such as a hard disk or CD-ROM drive, it should be appreciated by those skilled in the art that computer-storage media can be any available computer storage media that can be accessed by the computer 200.

By way of example and not limitation, computer storage media (also referred to herein as "computer-readable storage medium" or "computer-readable storage media") may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 200. "Computer storage media", "computer-readable storage medium" or "computer-readable storage media" as described herein do not include transitory signals.

According to various embodiments, the computer 200 may operate in a networked environment using connections to other local or remote computers through a network 216 via a network interface unit 210 connected to the bus 206. The network interface unit 210 may facilitate connection of the computing device inputs and outputs to one or more suitable networks and/or connections such as a local area network (LAN), a wide area network (WAN), the Internet, a cellular network, a radio frequency (RF) network, a Bluetooth-enabled network, a Wi-Fi enabled network, a satellite-based network, or other wired and/or wireless networks for communication with external devices and/or systems. The computer 200 may also include an input/output controller 208 for receiving and processing input from any of a number of input devices. Input devices may include one or more of keyboards, mice, stylus, touchscreens, microphones, audio capturing devices, and image/video capturing devices. An end user may utilize the input devices to interact with a user interface, for example a graphical user interface, for managing various functions performed by the computer 200. The bus 206 may enable the processing unit 202 to read code and/or data to/from the mass storage device 212 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology.

The computer storage media may also represent secondary storage, whether implemented as hard drives or otherwise. Hard drive implementations may be characterized as solid state, or may include rotating media storing magnetically-encoded information. The program modules 214, which include the imaging application 218, may include instructions that, when loaded into the processing unit 202 and executed, cause the computer 200 to provide functions associated with one or more example embodiments and implementations illustrated in FIGS. 3-11. The program modules 214 may also provide various tools or techniques by which the computer 200 may participate within the overall systems or operating environments using the components, flows, and data structures discussed throughout this description.

In general, the program modules 214 may, when loaded into the processing unit 202 and executed, transform the processing unit 202 and the overall computer 200 from a general-purpose computing system into a special-purpose computing system. The processing unit 202 may be constructed from any number of transistors or other discrete circuit elements, which may individually or collectively assume any number of states. More specifically, the processing unit 202 may operate as a finite-state machine, in response to executable instructions contained within the program modules 214. These computer-executable instructions may transform the processing unit 202 by specifying how the processing unit 202 transitions between states, thereby transforming the transistors or other discrete hardware elements constituting the processing unit 202. Encoding the program modules 214 may also transform the physical structure of the computer-storage media. The specific transformation of physical structure may depend on various factors, in different implementations of this description. Examples of such factors may include, but are not limited to the technology used to implement the computer-storage media, whether the computer storage media are characterized as primary or secondary storage, and the like. For example, if the computer storage media are implemented as semiconductor-based memory, the program modules 214 may transform the physical state of the semiconductor memory, when the software is encoded therein. For example, the program modules 214 may transform the state of transistors, capacitors, or other discrete circuit elements constituting the semiconductor memory.

As another example, the computer storage media may be implemented using magnetic or optical technology. In such implementations, the program modules 214 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Further details of certain example embodiments of the disclosed technology will now be discussed. In accordance with some example embodiments, the disclosed technology enables free-breathing SASHA $T_1$ mapping using image registration by acquiring additional secondary images with higher tissue-blood contrast to improve registration performance. A modified image readout is designed to enhance tissue-blood contrast without affecting $T_1$ accuracy, and the sampling scheme of saturation recovery times is optimized with simulations. Accuracy of the proposed high-contrast (HC) SASHA sequence is verified using phantom experiments. As discussed below with respect to certain example implementations and corresponding results of practicing aspects of the disclosed technology, free-breathing SASHA-HC was evaluated in a group of healthy volunteers and clinical patients with comparisons to standard breath-hold SASHA and MOLLI in volunteers.

In some example embodiments, the SASHA sequence consists of a set of single-shot balanced steady-state free precession (bSSFP) images with various saturation recovery preparation times (TS) or without saturation preparation (non-saturated, NS) [21]. Variable flip angle (VFA) ramping of the flip angles in the bSSFP readout is used to reduce the severity of image artifacts and increase $T_1$ precision by enabling 2-parameter model calculation of $T_1$ values with minimal systematic errors [28]. A Bloch equation simulation of transverse magnetization for native blood and myocardium during a VFA readout (FIG. 3) shows the time evolution of tissue-blood contrast. Conventional SASHA-VFA images have poor tissue-blood contrast because the k-space center is acquired early in the readout, prior to significant tissue-blood signal intensity differences, in order to minimize bias in derived $T_1$ values. Images acquired with a later center k-space can have better contrast, but $T_1$ maps calculated using this data can have larger systematic errors.

Figure 4A:
FIG. 4A is a diagram illustrating a partial sequence diagram of a high-contrast SASHA sequence (SASHA-HC) in accordance with an example embodiment of the disclosed technology, showing a non-saturated image and a saturation recovery image. Image acquisition is extended by ~40 ms by appending additional k-space lines (dashed red) to primary image readouts (light blue).
Figure 4B:
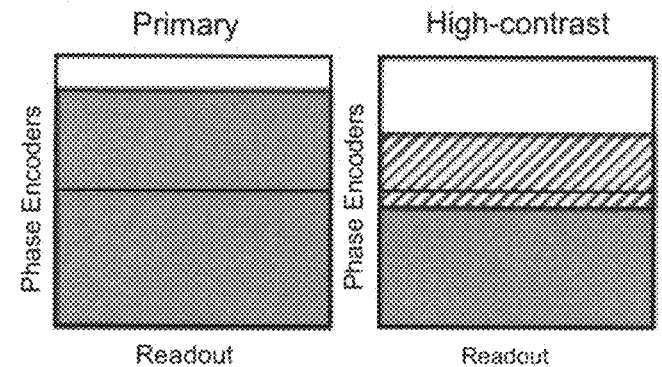
FIG. 4B is a diagram of k-space coverage for primary and high-contrast images. The lower half of k-space is shared between primary and high-contrast images, and the additional k-space lines cover the central portion of k-space.

In accordance with some example embodiments, high-contrast (HC) images can be acquired immediately following the standard primary image acquisition. A schematic diagram of a sequence and k-space coverage is shown in FIG. 4. The HC image acquisition consists of a small number of additional k-space lines at a higher acceleration rate covering the central portion of k-space. This data can be keyhole shared with high-frequency k-space data from the primary image (FIG. 4), as they are acquired immediately prior and have similar contrast. The temporal similarity and shared data between the images can ensure that they are intrinsically co-registered, thus allowing image registration performed on HC images to be directly applied to the primary images.

Among other benefits and advantages provided by practicing certain aspects of the disclosed technology in accordance with some example embodiments described herein, high-contrast images acquired with primary SASHA images can provide consistently high tissue-blood contrast, enabling a robust image registration approach to free-breathing SASHA $T_1$ mapping. Implementations of free-breathing SASHA-HC according to example embodiments of the disclosed technology can maintain excellent $T_1$ accuracy and robustness to systematic confounders and with $T_1$ precision higher than the reference MOLLI sequence with acquisitions longer than 30 s. Free-breathing imaging can be appealing to patients and can be more robust than breath-hold imaging in a clinical setting, as patients referred for cardiac MR examination, for instance, often have difficulty performing high quality breath-holds. Free-breathing SASHA-HC acquisition with similar precision to MOLLI represents an attractive approach for clinical patients where re-acquisitions due to poor breath-holding or gating are common occurrences. Free-breathing acquisitions in accordance with example embodiments of the disclosed technology can also be well-suited to pediatric patients, where breath-holds may be impractical or challenging.

EXAMPLE IMPLEMENTATIONS AND RESULTS

Various aspects of the disclosed technology may be still more fully understood from the following description of example implementations and corresponding results and the images of FIGS. 3-11. Some experimental data are presented herein for purposes of illustration and should not be construed as limiting the scope of the disclosed technology in any way or excluding any alternative or additional embodiments.

Methods

Sequence Design

Figure 3A:
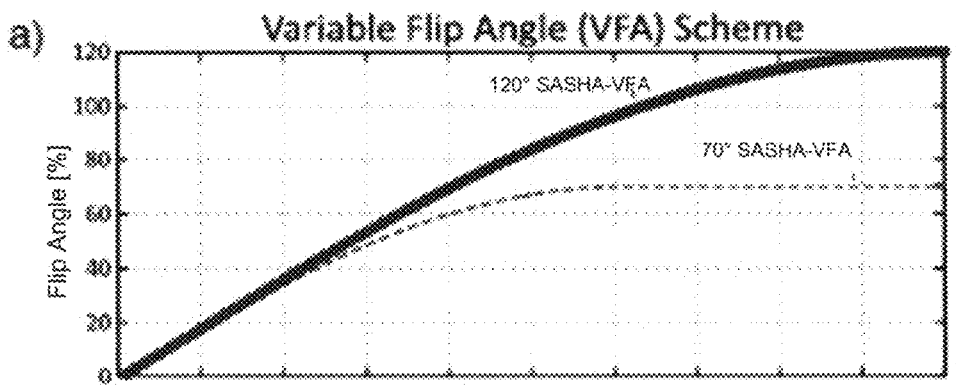
FIGS. 3A-3C illustrate a Bloch simulation of a sinusoidal-ramped variable flip angle (VFA) balanced steady-state free precession (bSSFP) readout for native myocardium ($T_1/T_2$=1175/50 ms) and blood ($T_1/T_2$=1650/240 ms).
Figure 3B:
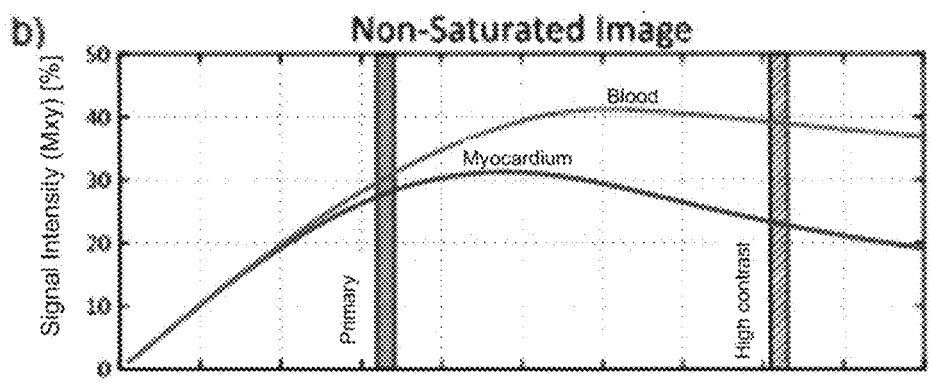
Figure 3C:
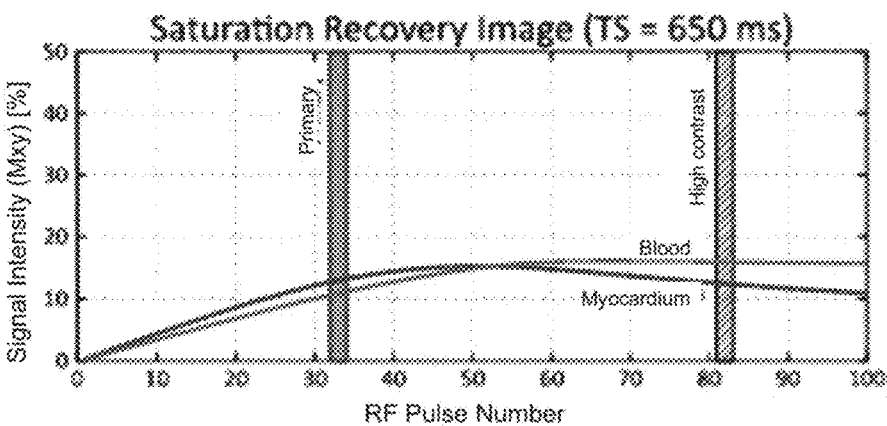

In accordance with an example implementation, the VFA modulation pattern follows a sinusoidal increase in flip angles in order to minimize off-resonance artifacts (FIG. 3). Lower initial flip angles minimize $T_2$-dependent errors in SASHA $T_1$ values when a 2-parameter model is used. In order to maximize the contrast of the HC image, a higher 120° final flip angle was used with a longer duration of VFA modulation, optimized to have similar accuracy characteristics as the original VFA pattern with a 70° final flip angle [28]. Bloch equation simulations incorporating slice profile effects were used to characterize the tissue-blood contrast of the proposed VFA scheme. Simulations used a $T_1/T_2$ of 1175/50 ms for native myocardium and a $T_1/T_2$ of 1650/240 ms for native blood [21].

General sequence parameters included: 1.19/2.76 ms TE/TR, 120° maximum flip angle, 0.6 ms Hanning-weighted sinc excitation RF pulses, 360×270 mm field of view, 256×150 matrix size, ⅞ ths partial Fourier, 78% phase resolution, and rate 2 acceleration for a total of 65 phase encodes for the primary image. The high-contrast acquisition consisted of 15 additional phase encodes at rate 3 acceleration, asymmetrically distributed across center k-space with 11 lines in the top half of k-space FIG. 4. Thirty-six fully-sampled k-space lines were acquired in a separate heartbeat for parallel imaging reconstruction calibration.

Sampling Scheme Optimization

In some example implementations, precision, i.e., uncertainty, in $T_1$ maps is determined by the total number of images used in its calculation as well as the sampling of the recovery curve, as defined by the TS times [29, 30]. For a 2-parameter model of $T_1$ fitting that assumes ideal saturation, an optimal pattern for a breath-hold acquisition is a single NS image followed by all remaining images at a fixed TS time less than the R-R interval [30]. Images with longer TS times that required multiple heartbeats were not found to improve precision for breath-hold imaging due to a corresponding reduction in the total number of acquired images.

Longer imaging times in free-breathing acquisitions allow more flexibility in sampling strategies, but any given image may be discarded if it is at a different respiratory phase than the rest of the images. To maximize sampling redundancy, a scheme consisting of only NS images and TS images less than an R-R interval was chosen. An optimal TS time and ratio of NS to TS images was determined by extending the analytical framework developed by Kellman et al. [30]. Simulations assumed TS images were acquired in every heartbeat and NS images required 4 additional non-imaging heartbeats for complete magnetization recovery, thus requiring 5 heartbeats each. The first NS image did not require non-imaging heartbeats, as it was assumed to be the first acquired image. For example, a 45 heartbeat acquisition duration would allow for 1 NS image and 44 TS images, 2 NS and 39 TS images, 3 NS and 34 TS images, and so forth. Simulations used a heart rate of 60 bpm, and higher heart rates can increase the number of images that could be acquired per unit time, thus increasing acquisition efficiency and reducing uncertainty in the calculated $T_1$ values.

Image Reconstruction

GRAPPA reconstruction [31] was used to fill in the undersampled k-space data for primary (solid blue, FIG. 4) and high-contrast (dashed red lines, FIG. 4) acquisitions. High-contrast k-space data was then combined with the lower part of k-space from the primary data and projection over convex sets (POCS) [32] was used to fill in the missing upper part of k-space. Difference images were calculated by subtracting the primary and HC images to further improve tissue-blood contrast.

Phantom Studies

Accuracy of the SASHA-HC sequence in accordance with example embodiments of the disclosed technology was compared against gold standard spin-echo $T_1$ measurements in a set of $NiCl_2$-doped agar phantoms ($T_1$MES) [33]. Inversion-recovery spin-echo measurements were performed on a 1.5 T Siemens MAGNETOM Avanto (Siemens Healthcare, Erlangen, Germany) scanner with a 300×131 mm field of view, 192×84 matrix size, 10 mm slice thickness, 90° flip angle, 11 ms echo time (TE), 19 inversion times (TI) spanning 50-3000 ms, and 10 s repetition time with one acquired k-space line per repetition. $T_2$ values were characterized using a spin-echo sequence with 8 TEs spanning 11-250 ms and other parameters as above. SASHA-VFA was acquired with both a 70° maximum flip angle and a 120° maximum flip angle as used in SASHA-HC. Both SASHA sequences had sequence parameters as described above with a NS image and 10 images with a TS of 600 ms. All SASHA sequences used an optimized 6-pulse train saturation design with <1% residual magnetization over the range of off-resonance ($B_0$) and radiofrequency ($B_1$) scale factors expected at 1.5 T and 3 T [34].

In-Vivo Studies

Ten healthy volunteers were imaged at 1.5 T, and $T_1$ mapping was performed on a single mid-ventricular short-axis slice using free-breathing 120° SASHA-VFA, breath-hold 120° SASHA-VFA, standard breath-hold 70° SASHA-VFA, and MOLLI sequences. Free-breathing 120° SASHA-VFA had 10 non-saturated images and 50 images with the longest TS time allowed by the subject's heart rate with other sequence parameters as described above. Respiratory position for each image was monitored using a conventional crossed-beam 1D navigator placed at the dome of the right hemi-diaphragm. Navigators were acquired immediately prior to the primary image for all SASHA acquisitions and were oriented to avoid overlap with the heart. An acceptance window of ±4 mm was prospectively prescribed, but navigator data was not used to trigger or re-acquire images.

Breath-held sequences were acquired during end-expiratory breath-holds with 1 non-saturated image and 10 TS images for SASHA-VFA with parameters as described above. MOLLI $T_1$ mapping was performed using a 5(4)3 acquisition scheme with a 121 ms minimum TI, 80 ms TI increment, 1.12/2.68 ms TE/TR, 35° flip angle, and matched resolution to SASHA-VFA.

$T_1$ mapping with free-breathing 120° SASHA-VFA was performed on 15 patients referred for clinical CMR examination or enrolled in ongoing clinical studies of ischemic heart disease or heart failure. $T_1$ mapping was also performed following contrast injection when permitted by the clinical protocol, using a fixed TS time that was decided based upon amount of contrast agent given and time elapsed following injection.

In-Vivo Image Analysis

SASHA $T_1$ maps were calculated using a 2-parameter model assuming ideal saturation and MOLLI $T_1$ maps were calculated using a 3-parameter model with Look-Locker correction [15, 35]. Free-breathing SASHA-VFA data was analyzed by using conventional respiratory navigator data (NAV) to select end-expiratory images using a ±4 mm acceptance window. Image registration was not used for breath-hold or navigator-gated data.

Figure 5:
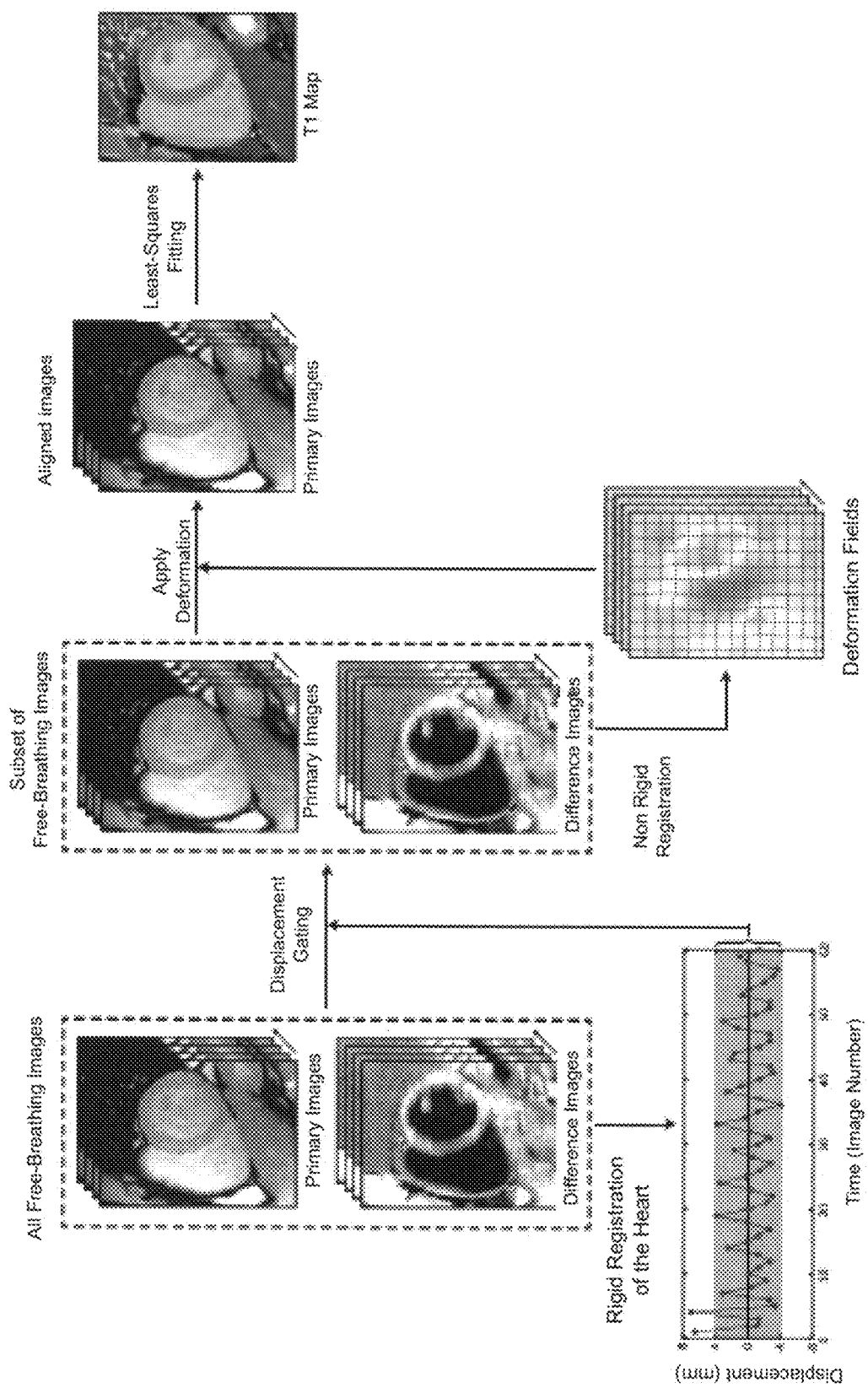
FIG. 5 illustrates an overview of an analysis for free-breathing SASHA-HC in accordance with an example embodiment of the disclosed technology. The displacement of the heart in free-breathing data is estimated using rigid image registration and used to select a subset of images for further analysis. The subset of images is aligned with a non-rigid image registration algorithm using both primary and difference images, and the resulting deformation fields are applied to the primary images. A $T_1$ map is calculated from the aligned images using non-linear least squared curve fitting.

The relative respiratory phase of free-breathing SASHA images was also estimated using the average displacement of the heart in the principal direction of motion, as defined by the direction with the highest singular value following singular value decomposition of the displacement matrix. Pair-wise affine registration was applied to a small image region around the heart and displacement was averaged over the entire region. An acceptance window of ±4 mm was used to discard images at very different respiratory phases due to the potential for through-plane motion and mis-registration artifacts. The position of the acceptance window was determined automatically to maximize the number of selected images. The subset of remaining images was aligned using the Advanced Normalization Tools (ANTs) software with a non-rigid image registration algorithm [36], using information from both the difference and primary images simultaneously (high-contrast image registration, HC-REG). Images were also aligned using information from only the primary images (normal image (without high-contrast) registration, NORM-REG) to determine the additive value of high-contrast difference images. Aligned images were obtained by applying the calculated deformation field using cubic spline interpolation in a single step to reduce blurring from repeated interpolation. An overview of the overall analysis for free-breathing SASHA with displacement gating and HC registration in accordance with some example embodiments is shown in FIG. 5.

The left ventricular (LV) myocardium from each $T_1$ map was manually segmented by identifying the endo-cardial and epicardial borders, and a blood pool contour was drawn in the LV cavity. Contouring was performed using custom analysis software that allowed visualization of contours on both $T_1$ maps and NS/TS images simultaneously. Myocardial contours were conservatively drawn with a narrow window level on the $T_1$ colormap to minimize partial voluming effects, and regions with artifacts on the NS/TS images were avoided. Myocardial and blood $T_1$ values were characterized by the mean and standard deviation of pixel map $T_1$ values within their respective contours. Tissue-blood contrast was characterized as the difference between myocardial and blood signal intensities. The change in contrast for both primary SASHA images and difference images was characterized by the ratio of tissue-blood differences for NS and TS images respectively.

Free-breathing SASHA data aligned using HC-REG were further analyzed to determine the in-vivo relationship between the precision of calculated $T_1$ maps and the number of raw images used. Additional $T_1$ maps were calculated from each dataset using incrementally fewer NS and TS images and the images selected were randomly chosen to reduce the influence of artifacts or mis-registration of any given image. A boot-strapping approach was used where this selection process was repeated 10 times for each combination of NS and TS images and the standard deviation of myocardial $T_1$ values was averaged over the 10 repetitions.

Image Quality Evaluation

Free-breathing SASHA $T_1$ maps from the 10 healthy volunteers and 15 clinical subjects reconstructed using NAV, NORM-REG, and HC-REG were evaluated by two experienced cardiologists on a 5-point scale (1-poor to 5-excellent). Cardiologists were blinded to the reconstruction method and asked to focus both on the presence of artifacts and the sharpness of the myocardial borders while grading.

Statistical Methods

Statistical analysis was performed in SAS 9.4 (SAS Institute, Cary, N.C., USA). Continuous variables and image quality scores are reported as mean±standard deviation. Comparisons between the blood and myocardial $T_1$ values derived from different $T_1$ mapping techniques were performed using linear mixed models (PROC MIXED) with subjects treated as a random factor. A similar analysis was performed for the image quality scores, controlling for the reader as a fixed effect. Normality assumptions were verified using q-q plots to visually assess for significant departures from normality. Statistical significance was set at $p<0.05$ with Tukey-Kramer adjustments for multiple comparisons where applicable.

Results

Simulations

Figure 6:
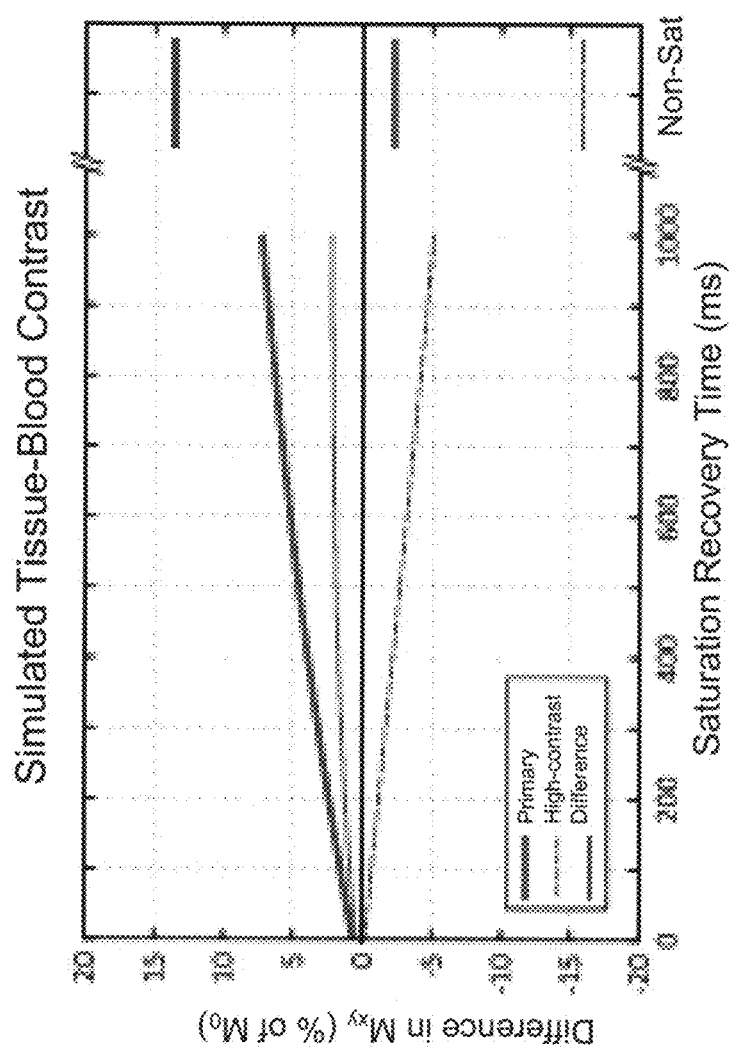
FIG. 6 shows a Bloch equation simulation of tissue-blood contrast for primary (thin green), high-contrast (dashed red), and difference (thick blue) images as a function of saturation recovery time. Contrast is characterized by the difference between myocardial and blood transverse magnetization ($M_{XY}$).

Bloch equation simulations show limited tissue-blood contrast for primary images, with reversed contrast between saturation recovery and non-saturated images (green line, FIG. 6). High-contrast images have greater contrast and blood is brighter than the myocardium for both NS and TS images. Subtracting the primary and high-contrast images to produce a difference image further improves contrast for the saturation recovery images, with a 3× increase in contrast compared to the primary images for a 700 ms TS time. Tissue-blood contrast increases for all images with longer TS times and non-saturated images had a 6× increase in contrast.

Figure 7A:
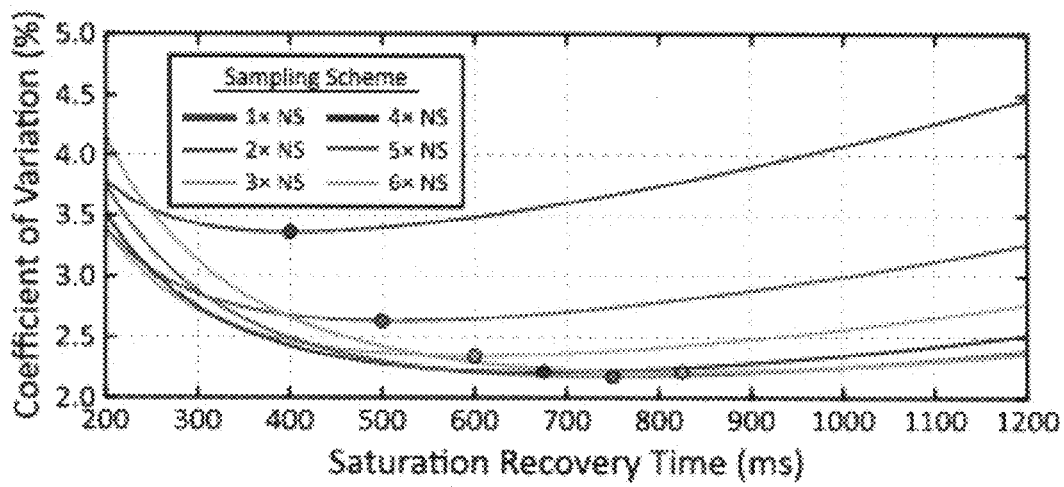
FIG. 7A shows simulated precision for native myocardium for an acquisition duration of 45 heartbeats. The optimal TS times, corresponding to the minimum coefficient of variation, are marked for sampling scheme with various non-saturated (NS) images.
Figure 7B:
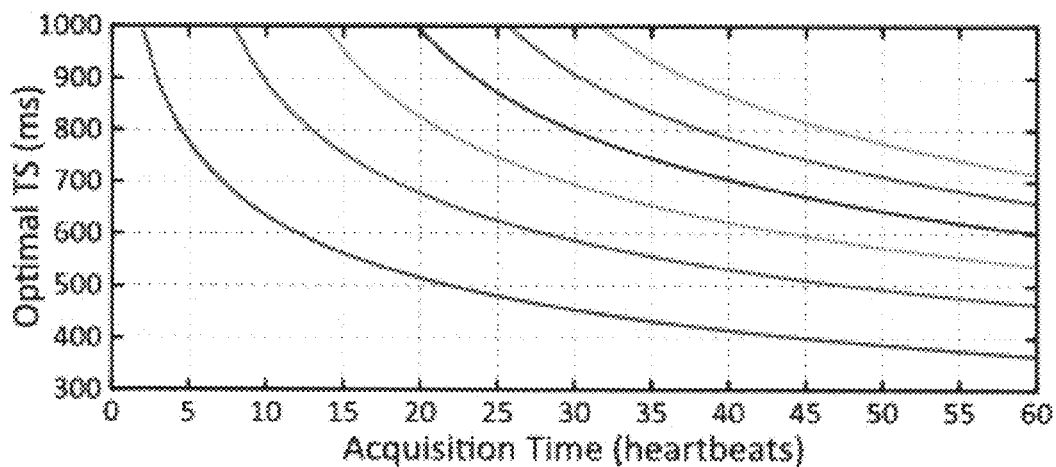
FIG. 7B shows optimal TS times (TS) for each sampling scheme, plotted as a function of total acquisition duration.
Figure 7C:
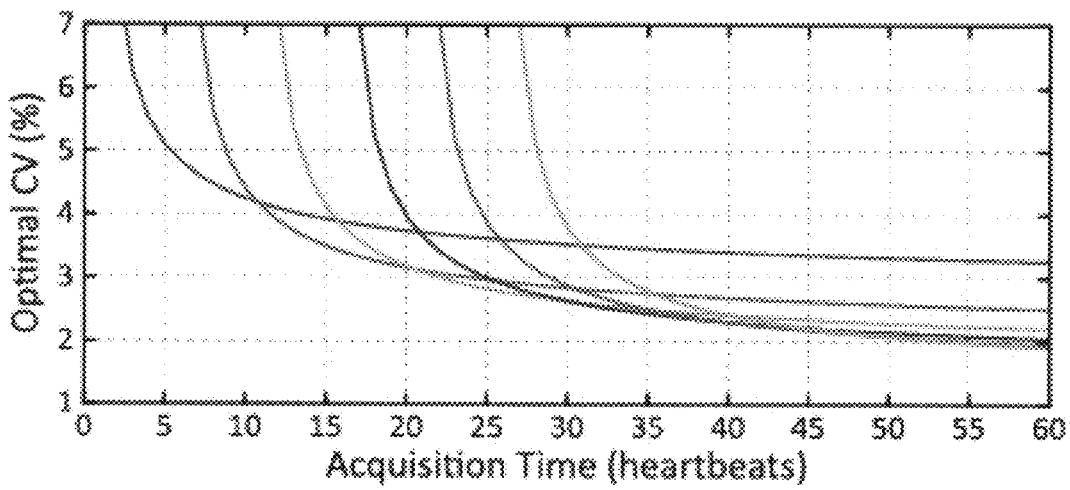
FIG. 7C shows optimal coefficients of variation (CV) is plotted as a function of acquisition time, using fixed times from FIG. 7B. All simulations shown assume a 100% acceptance rate and a heart rate of 60 bpm.

Relationships between TS time, precision, and acquisition time are summarized in FIG. 7. For a fixed acquisition time of 45 s, the optimal TS (with the lowest coefficient of variation) increases with the number of NS images acquired (FIG. 7A). However, the loss in precision for sub-optimal TS times is relatively small when more NS images are utilized in the reconstruction, as shown by the flat response between the coefficient of variation and TS times between 600 and 1000 ms. The optimal TS time also decreases with increasing acquisition times (FIG. 7B). Schemes with more than 1 NS image have lower variability with acquisition times longer than 11 heartbeats and schemes with ≥2 NS images have similar performance for acquisition times >40 heartbeats (FIG. 7C).

Phantom Studies

The phantom contained 9 vials with $T_1$ values spanning 259-1462 ms and $T_2$ values spanning 45-251 ms, as determined by spin-echo measurements. The mean error in standard 70° SASHA-VFA was −0.7±0.9% and the mean error in 120° SASHA-VFA was 0.2±1.1%.

In-Vivo Studies

Healthy subjects were aged 33±9 yo (4 female, 6 male) with heart rates of 60±7 bpm and patients were aged 61±11 yo (11 female, 4 male) with heart rates of 64±12 bpm. Free-breathing SASHA-HC acquisitions in accordance with example embodiments of the disclosed technology averaged 108±7 s in healthy volunteers. The TS time used in native imaging was 644±92 ms in volunteers and 616±118 ms in patients. Post-contrast imaging was available in 12 of 15 clinical subjects with TS times of 342±60 ms. The achievable maximum flip angle across all subjects was 119±3°.

Figure 8:
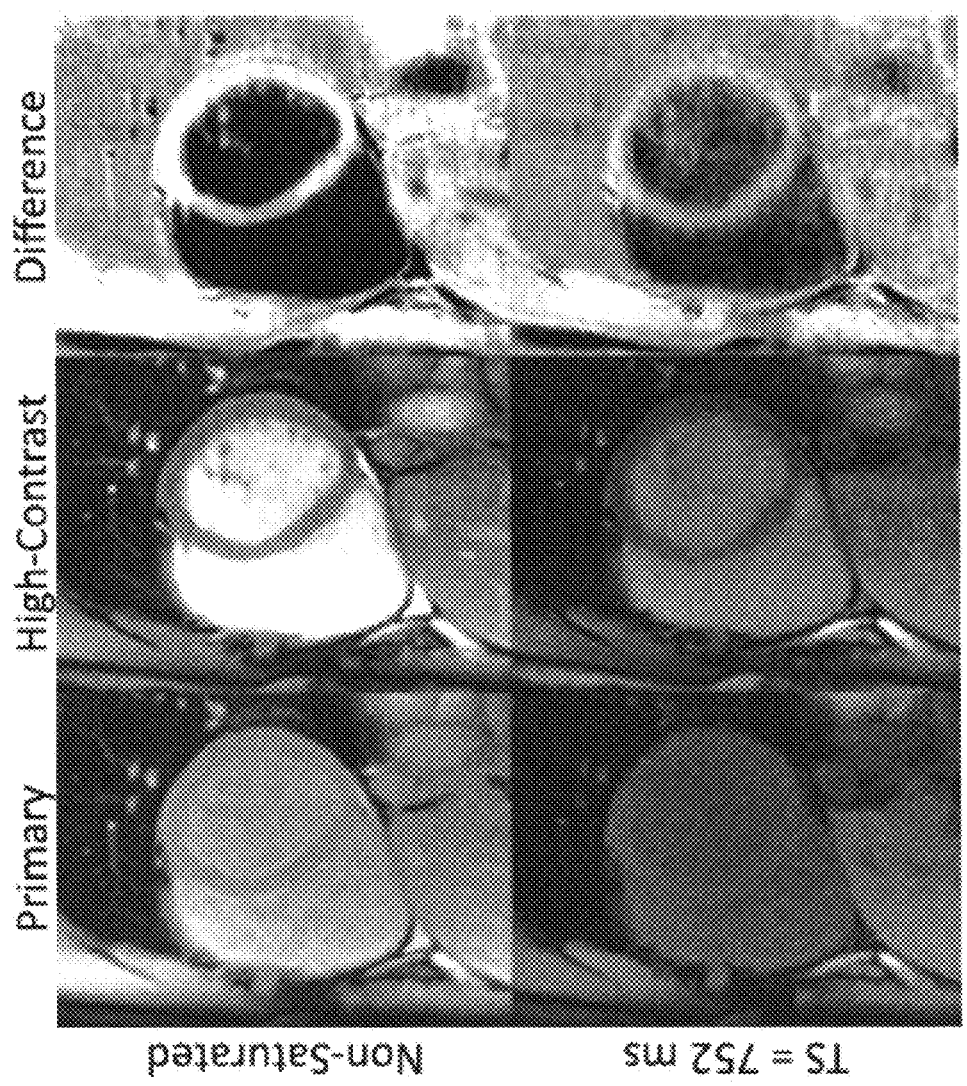
FIG. 8 shows primary, high-contrast, and difference images for non-saturated and saturation recovery preparation in a healthy subject. Brightness and contrast levels in displayed images are matched between the NS and TS images.

Primary, high-contrast, and difference images are shown for a healthy subject without gadolinium contrast in FIG. 8. The primary saturation recovery image has poorer tissue-blood contrast than the NS image, and the contrast is reversed. High-contrast images improve contrast for both images with moderate contrast in the TS image. Difference images have the highest tissue-blood contrast, and the contrast is consistent between NS and TS images. The average increase in tissue-blood contrast in the healthy volunteers was 5.7±1.7× for NS and 6.1±1.1× for TS images.

Navigator gating of free-breathing data in volunteers resulted in an acceptance rate of 49±17%, while the displacement gating had an acceptance rate of 91±11%. Mild to moderate residual motion was observed in most navigator-gated image series. NORM-REG had reasonable performance in correcting bulk motion of the heart, although misalignment of the septum was sometimes observed. Good quality image registration using HC-REG was observed for all subjects.

Free-breathing 120° SASHA-VFA $T_1$ maps reconstructed with HC-REG (i.e., SASHA-HC) had higher image scores (4.7±0.3 out of 5) than both NAV (3.6±0.4, $\rho<0.01$) or NORM-REG (3.7±0.4, $\rho<0.01$). Overall image scores were lower in patients (p<0.05), but similar trends were evident with HC-REG (4.1±0.7) having higher scores than both NAV (3.5±0.6) and NORM-REG (3.5±0.8).

Figure 9:
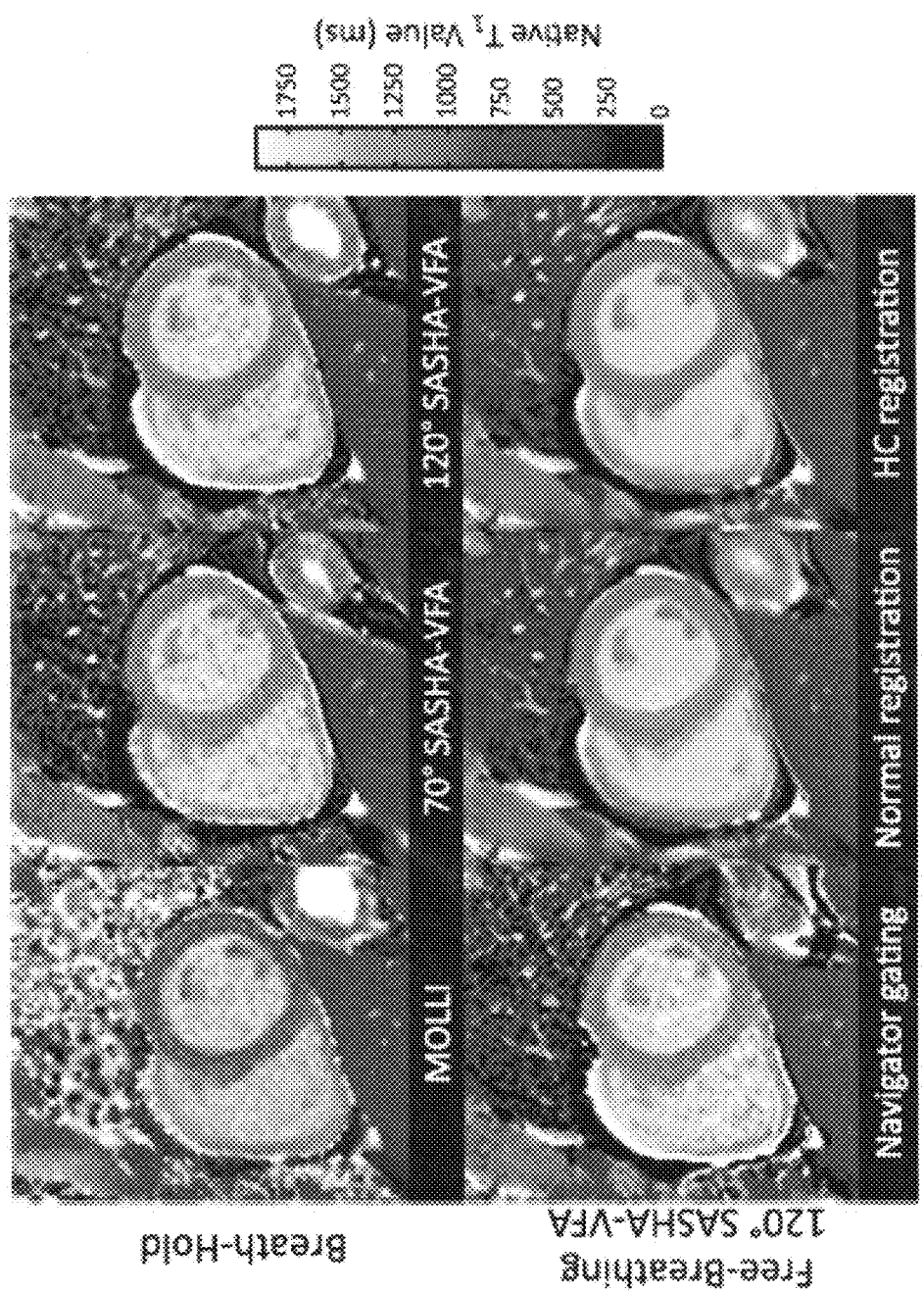
FIG. 9 shows $T_1$ maps from a healthy subject using various techniques. Images from breath-hold techniques are shown in the top row and the bottom row shows $T_1$ maps calculated from free-breathing 120° SASHA-VFA data using various approaches.

In-vivo $T_1$ measurements from all sequences are summarized in Table 1 (below), and $T_1$ maps from one subject are shown in FIG. 9. Myocardial $T_1$ values were not different between breath-hold 70° SASHA-VFA (1149±27 ms), breath-hold 120° SASHA-VFA (1148±22 ms), and free-breathing SASHA-HC (1156±28 ms). Free-breathing 120° SASHA-VFA data processed with NAV and NORM-REG analysis had higher myocardial $T_1$ values than breath-hold 120° SASHA-VFA, consistent with blood pool contamination due to inaccurate registration.

Standard deviations of myocardial $T_1$ values were similar between 70° and 120° breath-hold SASHA-VFA (73±8 ms vs 69±6 ms, $\rho>0.05$) and higher than MOLLI (55±6 ms, $\rho<0.01$ for both comparisons). All reconstruction techniques for free-breathing 120° SASHA-VFA $T_1$ maps had higher precision than breath-hold 70° SASHA-VFA, with HC-REG having the lowest standard deviation of mean myocardial $T_1$ (36±3 ms, $\rho<0.02$). Similar trends were seen for blood $T_1$ precision, but with a greater reduction in standard deviation between breath-hold 70° SASHA-VFA and SASHA-HC (91±14 ms vs 37±5 ms, $\rho<0.01$).

Figure 10:
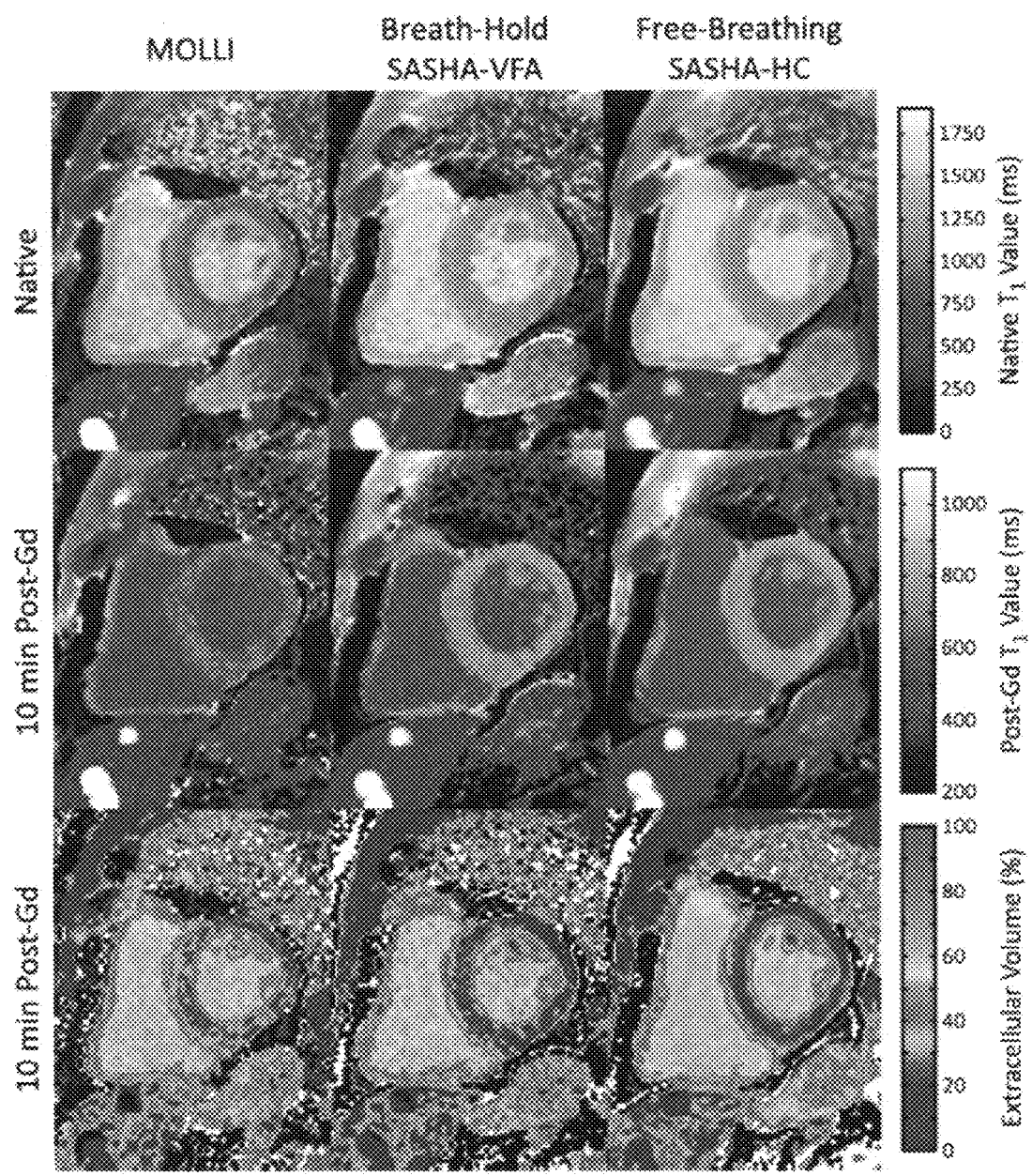
FIG. 10 shows $T_1$ maps from a clinical patient undergoing evaluation for coronary artery disease using MOLLI, breath-hold SASHA-VFA, and free-breathing SAHSA-HC. $T_1$ maps were acquired before and 10 minutes after administration of gadolinium contrast. EVC maps were calculated using an assumed hematocrit of 0.40.

Post-contrast imaging had greater tissue-blood contrast in primary SASHA images due to shorter $T_1$ values, and good performance was observed for both normal and high-contrast registration techniques. $T_1$ and ECV maps with MOLLI, SASHA-VFA, and SASHA-HC are shown in FIG. 10 for a clinical patient referred for evaluation of coronary artery disease. Increased precision in both native and post-contrast $T_1$ maps with free-breathing SASHA-HC, according to example embodiments of the disclosed technology, improves the precision of the derived ECV map.

Figure 11:
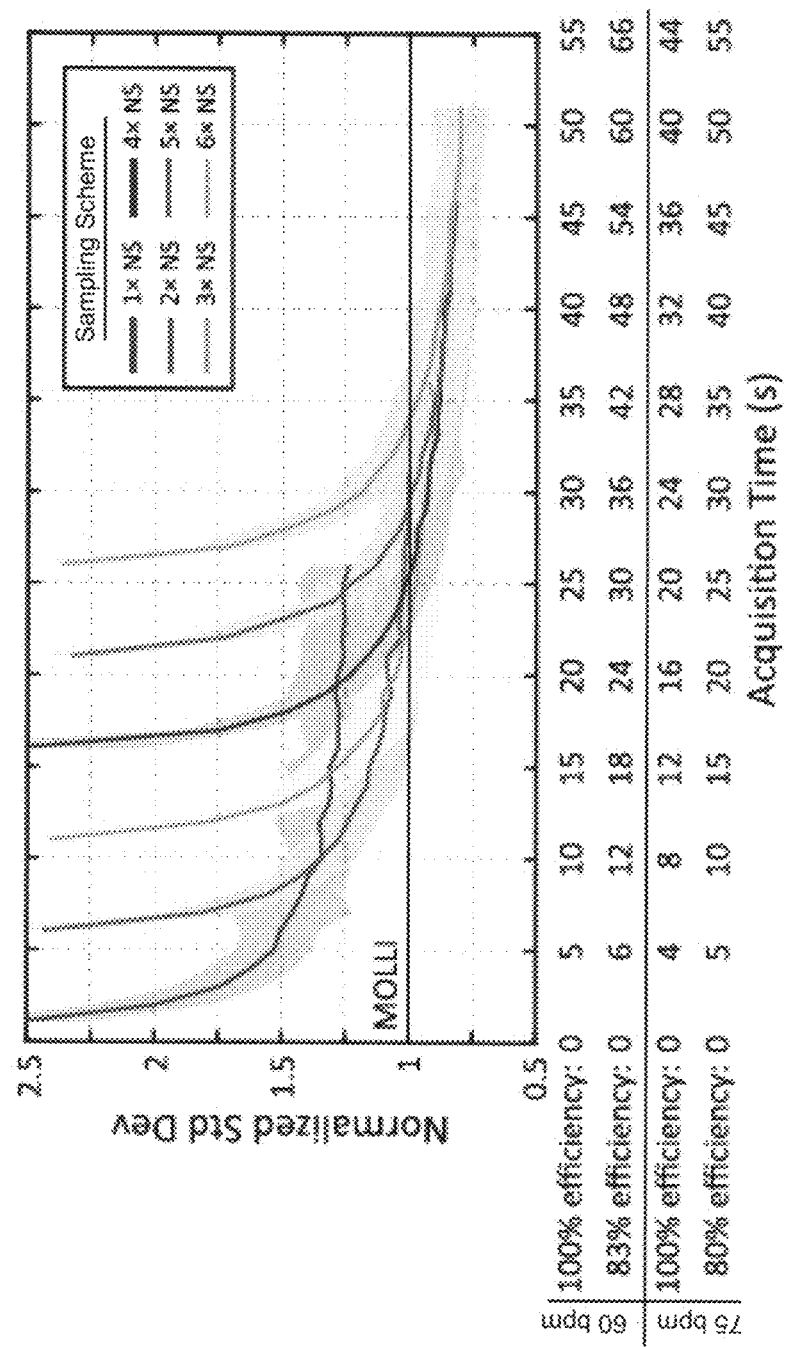
FIG. 11 shows measured myocardial $T_1$ precision of free-breathing SASHA with different sampling schemes in healthy volunteers with normalization to MOLLI. The mean normalization precision (over all subjects) is shown with solid lines and the corresponding colored shaded region indicates ±1 standard deviation. Acquisition time is shown on the x-axis for various different gating efficiencies at hear rates of 60 and 75 bpm.

The relationship between myocardial SASHA-HC $T_1$ precision and total imaging time measured in-vivo shown in FIG. 11 is in agreement with optimization simulations (FIG. 7C). At longer acquisition times, sampling strategies with more NS images have similar variability to strategies with fewer NS images and more TS images. At higher heart rates, the acquisition time is reduced because the number of images acquired per unit time is increased. With a heart rate of 60 bpm and an acceptance rate of 83%, free-breathing SASHA has similar variability to MOLLI with a 30 s acquisition. With 60 s of acquisition, free-breathing SASHA had a 20% lower standard deviation than MOLLI.

Discussion

In accordance with some example embodiments, a free-breathing SASHA-HC $T_1$ mapping technique using high-contrast images is disclosed, which improves non-rigid image registration. In certain implementations, the technique was evaluated in 25 volunteers and patients, and SASHA $T_1$ maps with high-contrast registration had higher image quality scores than $T_1$ maps with navigator gated or standard image registration analysis. The results from some implementations of free-breathing SASHA-HC, with a 108 s acquisition, show a 50% reduction in the standard deviation of myocardial $T_1$ values compared to the standard breath-hold SASHA-VFA with no bias in mean $T_1$ values.

Image registration of free-breathing SASHA-HC images in accordance with some example embodiments resulted in superior $T_1$ map quality compared to both standard image registration without high-contrast images and conventional navigator gating. Accuracy of the SASHA-HC sequence was verified in phantoms, and myocardial $T_1$ values were not different from the previously validated SASHA-VFA sequence.

Sampling Scheme Optimization

Sampling strategies described herein used only non-saturated and saturation recovery images at the maximum TS time allowable by the subject's heart rate. This allowed the greatest tissue-blood contrast (FIGS. 6 and 7). Optimization was performed for native myocardium at 1.5 T, and further optimization may be investigated for post-contrast and 3 T imaging. Bloch equation simulations of tissue-blood contrast did not account for the in-flow enhancement of blood signal. For NS images, inflow enhancement increases blood-tissue contrast for both primary and high-contrast images compared to simulations. For TS images, inflow enhancement reduces contrast in the primary images and increases contrast in the high-contrast image FIG. 3. This is consistent with a greater than expected increase in experimentally measured tissue-blood contrast compared with simulations.

The simplicity of acquiring images with only two contrasts allows for additional flexibility in the reconstruction process. For example, within each set of NS or TS images, differences in image contrast can be assumed to only be due to motion or random noise. This information can be exploited to reject images with poor motion correction and further improve the sharpness of calculated $T_1$ maps. This may be particularly useful in patients with arrhythmias or poor cardiac triggering where MOLLI-like techniques that rely on regular heart rhythms over Look-Locker sets of 3-5 images may perform poorly. Free-breathing SASHA-HC may be applied in these patients by acquiring data over a longer duration, determining the most common cardiac phase post-hoc, and discarding the remaining images.

The relationship between acquisition time and $T_1$ precision is modulated by the acceptance rate, which in some implementations averaged 91% with the displacement gating approach. Lower acceptance rates may be likely in patients with greater respiratory motion, although the efficiency of displacement gating was nearly double that of conventional respiratory gating of the diaphragm. As with conventional respiratory gating, acceptance rates may be further improved by coaching subjects to breath shallowly.

In certain implementations, in-vivo data was acquired with 10 NS and 50 TS images and required an average of 108 s in volunteers. However, small improvements were found in myocardial precision with acquisition times beyond 45 s (FIG. 11). A 60 s protocol with 6 NS and 30 TS images may likely provide similar precision to $T_1$ maps found in implementations in accordance with the disclosed technology, with allowance for lower acceptance rates. A shorter 30 s protocol with 4 NS and 10 TS images may be used in condensed clinical studies and may provide similar precision to MOLLI. These protocols assume a heart rate of 60 bpm and may be shorter in subjects with higher heart rates due to their shorter R-R duration.

The recovery duration between non-saturated images is described herein in heartbeats to simplify descriptions of total acquisition times. In practice, the recovery duration can be defined as a fixed number of seconds to ensure complete magnetization recovery between NS images even with high heart rates [20]. This reduces the time savings from shorter R-R intervals at faster heart rates, but avoids heart rate dependent errors in $T_1$ values. At a high heart rate of 100 bpm, the 6 NS and 30 TS protocol described above would be 48 s while the 4 NS and 10 TS protocol would be 26 s.

In some implementations, the displacement gating acceptance window was set at ±4 mm to match the ±4 mm respiratory navigator window and minimize the likelihood of errors due to mis-registration or through-plane effects. Image registration using ANTs was found to be robust when using difference images, although the acceptance window may be lowered for more challenging datasets where registration performance is worse.

Displacement gating was found to work well in short-axis image orientations where respiratory motion is primarily

TABLE 1

Summary of $T_1$ mapping parameters from 10 volunteers

| | Breath-hold | | | Free-Breathing 120° SASHA-VFA | | |
|---|---|---|---|---|---|---|
| | MOLLI | 70° SASHA-VFA | 120° SASHA-VFA | NAV | NORM-REG | HC-REG |
| Myocardial Mean (ms) | 943.2 ± 22.2* | 1149.4 ± 26.5 | 1147.7 ± 22.2 | 1161.7 ± 28.2* | 1167.3 ± 27.7* | 1156.1 ± 28.1 |
| Myocardial Std Dev (ms) | 54.7 ± 5.9* | 72.7 ± 8.0 | 68.6 ± 5.9 | 48.0 ± 6.7* | 45.7 ± 7.4* | 36.2 ± 3.1* |
| Blood Mean (ms) | 1503.3 ± 51.5* | 1614.3 ± 60.9 | 1629.5 ± 73.8 | 1639.6 ± 72.9* | 1625.6 ± 69.4 | 1632.6 ± 73.3 |
| Blood Std Dev (ms) | 56.0 ± 7.9* | 97.8 ± 11.8 | 90.7 ± 13.8 | 54.8 ± 10.1* | 43.0 ± 8.6* | 37.3 ± 4.7* |
| Acquisition Time (s) | 11.0 ± 1.2 | 10.0 ± 1.1 | 10.1 ± 1.2 | 107.7 ± 7.3 | 107.7 ± 7.3 | 107.7 ± 7.3 |
| Acceptance Rate (%) | 100.0 ± 0.0 | 100.0 ± 0.0 | 100.0 ± 0.0 | 49.3 ± 16.7 | 94.0 ± 13.3 | 94.0 ± 13.3 |

*$p < 0.05$ compared to breath-hold 70° SASHA-VFA

High-Contrast Image-Based Registration

In certain implementations, the above-described high-contrast image registration technique involved the acquisition of an additional 15 low-frequency k-space lines following each primary image, amounting to an additional 41 ms of imaging. The primary images are therefore acquired slightly earlier in the cardiac cycle than usual, although the temporal footprint is unchanged as the additional k-space lines are not used for the primary images. No significant artifacts due to cardiac phase motion were observed.

Tissue-blood contrast for HC images was generated using VFA modulation with high final flip angles in order to enhance the intrinsic bSSFP contrast. These high flip angles required a maximum $B_1$ strength of 0.30 μT and were routinely achievable on the 1.5 T system used in this study. However, a maximum routinely achievable B1 of only 0.14 μT was previously reported for 3 T systems [34] and SAR limitations may further limit the maximum flip angles on higher field strength scanners. Additional optimization of the VFA modulation pattern and/or RF pulses to use lower flip angles may be required to apply SASHA-HC at higher field strengths. Such work may include lengthening the RF pulse duration, using variable-rate selective excitation (VERSE) [37], or using parallel transmit excitation [38] to address power and SAR limitations.

Respiratory Displacement Gating

Displacement gating of respiratory motion for cardiac $T_1$ mapping is an appealing alternative to traditional crossed-beam navigators of the diaphragm because the motion of the heart itself is estimated. This approach was found to be robust and had significantly higher gating efficiency than traditional respiratory navigators. As displacement gating is performed on the acquired images directly, it does not require the additional setup imaging needed for conventional respiratory navigators. Furthermore, unlike traditional navigator gating where the acceptance window is specified prior to imaging and the total imaging duration is dependent on a consistent respiratory pattern, displacement gating is performed during post-processing and the total imaging time is known in advance.

in-plane, allowing for very high acceptance rates. For slice orientations, such as a 4-chamber view where respiratory motion is primarily through-plane, other metrics, such as image similarity [27, 39], may be used for gating instead. These metrics can likely be applied with minimal additional modification, as the signal intensity changes between images in the NS or TS subsets are primarily driven by motion. As through-plane motion cannot be corrected through in-plane motion correction, a lower acceptance rate such as 50% [27] may be used to maintain good image quality.

Free-Breathing $T_1$ Mapping Applications

Free-breathing imaging is appealing to patients and can be more robust than breath-hold imaging in a clinical setting, as patients referred for cardiac MR examination often have difficulty performing high-quality breath-holds. A 30 s free-breathing SASHA-HC acquisition in accordance with example embodiments of the disclosed technology, with similar precision to MOLLI, is an attractive alternative for clinical patients where re-acquisitions due to poor breath-holding or gating are common occurrences. Free-breathing acquisitions are also well-suited to pediatric patients, where breath-holds may be impractical or challenging.

CONCLUSION

The specific configurations, choice of materials and the size and shape of various elements can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. The patentable scope of certain embodiments of the disclosed technology is indicated by the appended claims, rather than the foregoing description, and all changes that come within the meaning and range of equivalents thereof are intended to be embraced therein.

REFERENCE LIST

1. Kali A, Choi E-Y, Sharif B, Kim Y J, Bi X, Spottiswoode B, et al. Native $T_1$ mapping by 3-T CMR imaging for characterization of chronic myocardial infarctions. JACC Cardiovasc Imaging. 2015; 8:1019-30.
2. Dass S, Suttie J J, Piechnik S K, Ferreira V M, Holloway C J, Banerjee R, et al. Myocardial tissue characterization using magnetic resonance noncontrast $T_1$ mapping in hypertrophic and dilated cardiomyopathy. Circ Cardiovasc Imaging. 2012; 5:726-33.
3. Karamitsos T D, Piechnik S K, Banypersad S M, Fontana M, Ntusi N B, Ferreira V M, et al. Noncontrast $T_1$ mapping for the diagnosis of cardiac amyloidosis. JACC Cardiovasc Imaging. 2013; 6:488-97.
4. Brooks J, Kramer C M, Salerno M. Markedly increased volume of distribution of gadolinium in cardiac amyloidosis demonstrated by $T_1$ mapping. J Magn Reson Imaging. 2013; 38:1591-5.
5. Sado D M, Maestrini V, Piechnik S K, Banypersad S M, White S K, Flett A S, et al. Noncontrast myocardial $T_1$ mapping using cardiovascular magnetic resonance for iron overload. J Magn Reson Imaging. 2014; 41:1505-11.
6. Sado D M, White S K, Piechnik S K, Banypersad S M, Treibel T, Captur G, et al. Identification and assessment of Anderson-Fabry disease by cardiovascular magnetic resonance noncontrast myocardial $T_1$ mapping. Circ Cardiovasc Imaging. 2013; 6:392-8.
7. Thompson R B, Chow K, Khan A, Chan A, Shanks M, Paterson D I, et al. $T_1$ mapping with cardiovascular MRI is highly sensitive for Fabry disease independent of hypertrophy and sex. Circ Cardiovasc Imaging. 2013; 6: 637-45.
8. Pica S, Sado D M, Maestrini V, Fontana M, White S K, Treibel T, et al. Reproducibility of native myocardial $T_1$ mapping in the assessment of Fabry disease and its role in early detection of cardiac involvement by cardiovascular magnetic resonance. J Cardiovasc Magn Reson. 2014; 16:99.
9. Sado D M, Flett A S, Banypersad S M, White S K, Maestrini V, Quarta G, et al. Cardiovascular magnetic resonance measurement of myocardial extracellular volume in health and disease. Heart. 2012; 98:1436-41.
10. Kellman P, Wilson J R, Xue H, Ugander M, Arai A E. Extracellular volume fraction mapping in the myocardium, part 1: evaluation of an automated method. J Cardiovasc Magn Reson. 2012; 14:63.
11. Kellman P, Wilson J R, Xue H, Bandettini W P, Shanbhag S M, Druey K M, et al. Extracellular volume fraction mapping in the myocardium, part 2: initial clinical experience. J Cardiovasc Magn Reson. 2012; 14:64.
12. Jellis C, Wright J, Kennedy D, Sacre J, Jenkins C, Haluska B, et al. Association of imaging markers of myocardial fibrosis with metabolic and functional disturbances in early diabetic cardiomyopathy. Circ Cardiovasc Imaging. 2011; 4:693-702.
13. Bull S, White S K, Piechnik S K, Flett A S, Ferreira V M, Loudon M, et al. Human non-contrast $T_1$ values and correlation with histology in diffuse fibrosis. Heart. 2013; 99:932-7.
14. Kuruvilla S, Janardhanan R, Antkowiak P, Keeley E C, Adenaw N, Brooks J, et al. Increased Extracellular Volume and Altered Mechanics Are Associated With LVH in Hypertensive Heart Disease. Not Hypertension Alone. JACC Cardiovasc Imaging. 2015; 8:172-80.
15. Messroghli D R, Radjenovic A, Kozerke S, Higgins D M, Sivananthan M U, Ridgway J P. Modified Look-Locker inversion recovery (MOLLI) for high-resolution $T_1$ mapping of the heart. Magn Reson Med. 2004; 52:141-6.
16. Messroghli D R, Greiser A, Fröhlich M, Dietz R, Schulz-Menger J. Optimization and validation of a fully-integrated pulse sequence for modified look-locker inversion-recovery (MOLLI) $T_1$ mapping of the heart. J Magn Reson Imaging. 2007; 26:1081-6.
17. Chow K, Flewitt J A, Pagano J J, Green J D, Friedrich M G, Thompson R B. T2-dependent errors in MOLLI $T_1$ values: simulations, phantoms, and in-vivo studies. J Cardiovasc Magn Reson. 2012; 14:P281.
18. Robson M D, Piechnik S K, Tunnicliffe E M, Neubauer S. $T_1$ measurements in the human myocardium: The effects of magnetization transfer on the SASHA and MOLLI sequences. Magn Reson Med. 2013; 70:670.
19. Kellman P, Herzka D A, Arai A E, Hansen M S. Influence of Off-resonance in myocardial $T_1$-mapping using SSFP based MOLLI method. J Cardiovasc Magn Reson. 2013; 15:63.
20. Kellman P, Hansen M S. $T_1$-mapping in the heart: accuracy and precision. J Cardiovasc Magn Reson. 2014; 16:2.
21. Chow K, Flewitt J A, Green J D, Pagano J J, Friedrich M G, Thompson R B. Saturation recovery single-shot acquisition (SASHA) for myocardial $T_1$ mapping. Magn Reson Med. 2014; 71:2082-95.
22. Slavin G S, Hood M N, Ho V B, Stainsby J A. Breath-Held Myocardial $T_1$ Mapping Using Multiple Single-Point Saturation Recovery. Proc Intl Soc Mag Reson Med. 2012; 20:1244.
23. Weingartner S, Akçakaya M, Basha T, Kissinger K V, Goddu B, Berg S, et al. Combined saturation/inversion recovery sequences for improved evaluation of scar and diffuse fibrosis in patients with arrhythmia or heart rate variability. Magn Reson Med. 2014; 71:1024-34.
24. Taylor A J, Salerno M, Dharmakumar R, Jerosch-Herold M. $T_1$ Mapping: Basic Techniques and Clinical Applications. JACC Cardiovasc Imaging. 2016; 9:67-81.
25. Mehta B B, Chen X, Bilchick K C, Salerno M, Epstein F H. Accelerated and navigator-gated look-locker imaging for cardiac $T_1$ estimation (ANGIE): Development and application to $T_1$ mapping of the right ventricle. Magn Reson Med. 2014.
26. Kellman P, Larson A C, Hsu L-Y, Chung Y-C, Simonetti O P, McVeigh E R, et al. Motion-corrected free-breathing delayed enhancement imaging of myocardial infarction. Magn Reson Med. 2005; 53:194-200.
27. Kellman P, Xue H, Spottiswoode B S, Sandino C M, Hansen M S, Abdel-Gadir A, et al. Free-breathing T2* mapping using respiratory motion corrected averaging. J Cardiovasc Magn Reson. 2015; 17:3.
28. Chow K, Spottiswoode B, Pagano J J, Thompson R. Improved precision in SASHA $T_1$ mapping with a variable flip angle readout. J Cardiovasc Magn Reson. 2014; 16:M9.
29. Akçakaya M, Weingärtner S, Roujol S, Nezafat R. On the selection of sampling points for myocardial $T_1$ mapping. Magn Reson Med. 2015; 73: 1741-53.
30. Kellman P, Xue H, Chow K, Spottiswoode B S, Arai A E, Thompson R B. Optimized saturation recovery protocols for $T_1$-mapping in the heart: influence of sampling strategies on precision. J Cardiovasc Magn Reson. 2014; 16:55.
31. Griswold M A, Jakob P M, Heidemann R M, Nittka M, Jellus V, Wang J, et al. Generalized autocalibrating partially parallel acquisitions (GRAPPA). Magn Reson Med. 2002; 47:1202-10.

32. Haacke E M, Lindskogj E D, Lin W. A fast, iterative, partial-fourier technique capable of local phase recovery. J Magn Reson. 1991; 92:126-45.
33. Captur G, Gatehouse P D, Heslinga F G, Keenan K, Bruehl R, Prothmann M, et al. A $T_1$ and ECV phantom for global $T_1$ mapping quality assurance: The $T_1$ mapping and ECV standardisation in CMR ($T_1$MES) program. J Cardiovasc Magn Reson. 2016; 18:W18-W571.
34. Chow K, Kellman P, Spottiswoode B S, Nielles-Vallespin S, Arai A E, Salerno M, et al. Saturation pulse design for quantitative myocardial T 1 mapping. J Cardiovasc Magn Reson. 2015; 17:84.
35. Deichmann R, Haase A. Quantification of $T_1$ values by SNAPSHOT-FLASH NMR imaging. J Magn Reson. 1992; 96:608-12.
36. Avants B B, Tustison N J, Song G, Cook P A, Klein A, Gee J C. A reproducible evaluation of ANTs similarity metric performance in brain image registration. Neuroimage. 2011; 54:2033-44.
37. Hargreaves B A, Cunningham C H, Nishimura D G, Conolly S M. Variable-rate selective excitation for rapid MRI sequences. Magn Reson Med. 2004; 52: 590-7.
38. Katscher U, Börnert P. Parallel R F transmission in MRI. NMR Biomed. 2006; 19:393-400.
39. Ledesma-Carbayo M J, Kellman P, Hsu L-Y, Arai A E, McVeigh E R. Motion corrected free-breathing delayed-enhancement imaging of myocardial infarction using non-rigid registration. J Magn Reson Imaging. 2007; 26:184-90.

What is claimed is:

1. A method, comprising:
   acquiring magnetic resonance imaging data for a first plurality of images, of the heart of a subject, during free breathing of the subject;
   generating an additional, second plurality of images with high tissue-blood contrast over a region of interest to improve registration of low contrast images, wherein the first plurality of images is subsequently used for parametric mapping and has a lower tissue-blood contrast than the second plurality of images;
   selecting a subset of images from the first plurality of images, based upon a pre-determined quality metric of image similarity, to be used for non-rigid image registration;
   aligning the subset of images by non-rigid image registration, using a combination of the first plurality of images and the second plurality of images to improve registration due to the high tissue-blood contrast of the second plurality of images; and
   creating a parametric map from the aligned images from the first plurality of images.

2. The method of claim 1, further comprising obtaining additional imaging data to generate the second plurality of images.

3. The method of claim 1, wherein the second plurality of images is generated from a subset of the acquired magnetic resonance imaging data from the first plurality of images.

4. The method of claim 2, further comprising producing, from the first plurality of images and using the additional imaging data, high-contrast images of the region of interest.

5. The method of claim 4, wherein the additional imaging data is obtained by acquiring additional k-space data covering a central portion of k-space, and wherein generating the second plurality of images comprises sharing the additional imaging data with k-space data acquired from the first plurality of images.

6. The method of claim 2, wherein the imaging data is obtained using saturation recovery, inversion recovery, a diffusion preparation, or a T2 preparation.

7. The method of claim 1, wherein acquiring the imaging data uses a gradient echo-based readout module, steady-state free precession-based, spin-echo based readout module, or gradient and spin echo based readout module.

8. The method of claim 1, wherein acquiring the imaging data comprises acquiring k-space along a cartesian, spiral, or radial trajectory.

9. The method of claim 1, wherein acquiring the imaging data comprises applying a saturation recovery, inversion recovery, T2-preparation, diffusion preparation, or magnetization transfer preparation.

10. The method of claim 9, wherein acquiring the imaging data comprises applying a saturation recovery-based sequence, and wherein applying the saturation recovery-based sequence comprises applying a single-shot steady-state free precession (SSFP) acquisition.

11. The method of claim 1, wherein correlation or a similar metric is used to estimate the image similarity and the subset of images is selected based on the quality metric.

12. The method of claim 1, further comprising estimating displacement of the heart from respiratory motion of the subject, using rigid or non-rigid image registration, and wherein the subset of images is selected based on a similarity metric of the displacement of the heart.

13. The method of claim 1, wherein aligning the subset of images using non-rigid image registration comprises determining a deformation field from the non-rigid image registration and applying the deformation field to at least some images of the subset of images to align the subset of images.

14. The method of claim 1, wherein the non-rigid image registration comprises applying a non-rigid image registration algorithm using primary images and difference images of the subset of images.

15. The method of claim 1, wherein the parametric map is derived from a contrast preparation using saturation recovery, inversion recovery, T2-preparation, diffusion preparation, or magnetization transfer preparation.

16. The method of claim 1, wherein the parametric map is a T1 map.

17. The method of claim 1, wherein the parametric map is determined by fitting a model-based equation.

18. A system, comprising:
   a data acquisition device configured to acquire magnetic resonance imaging data for a first plurality of images, of the heart of a subject, during free breathing of the subject; and
   one or more processors configured to cause the system to perform functions comprising:
      generating an additional, second plurality of images with high tissue-blood contrast over a region of interest to improve registration of low contrast images, wherein the first plurality of images is subsequently used for parametric mapping and has a lower tissue-blood contrast than the second plurality of images;
      selecting a subset of images from the first plurality of images, based upon a pre-determined quality metric of image similarity, to be used for non-rigid image registration;
      aligning the subset of images by non-rigid image registration, using a combination of the first plurality of images and the second plurality of images to improve registration performance due to the high tissue-blood contrast of the second plurality of images; and creating a parametric map from the aligned images from the first plurality of images.

19. A non-transitory computer-readable medium having stored instructions that, when executed by one or more processors, cause a computing device to perform functions that comprise:

acquiring magnetic resonance imaging data for a first plurality of images, of the heart of a subject, during free breathing of the subject;

generating an additional, second plurality of images with high tissue-blood contrast over a region of interest to improve registration of low contrast images, wherein the first plurality of images is subsequently used for parametric mapping and has a lower tissue-blood contrast than the second plurality of images;

selecting a subset of images from the first plurality of images, based upon a pre-determined quality metric of image similarity, to be used for non-rigid image registration;

aligning the subset of images by non-rigid image registration, using a combination of the first plurality of images and the second plurality of images to improve registration performance due to the high tissue-blood contrast of the second plurality of images; and creating a parametric map from the aligned images from the first plurality of images.

* * * * *